US012299098B2

(12) United States Patent
Derckx et al.

(10) Patent No.: US 12,299,098 B2
(45) Date of Patent: May 13, 2025

(54) POINTING DEVICE WITH BIOMETRIC SKIN-CONTACT SENSOR, AND CORRESPONDING METHOD

(71) Applicant: TOUCH BIOMETRIX LIMITED, Wales (GB)

(72) Inventors: Henricus Derckx, St Asaph (GB); Wilhelmus Van Lier, St Asaph (GB); Michael A. Cowin, St Asaph (GB)

(73) Assignee: TOUCH BIOMETRIX LIMITED, St. Asaph (GB)

( * ) Notice: Subject to any disclaimer, the term of this patent is extended or adjusted under 35 U.S.C. 154(b) by 487 days.

(21) Appl. No.: 17/616,479

(22) PCT Filed: Jun. 5, 2020

(86) PCT No.: PCT/GB2020/051371
§ 371 (c)(1),
(2) Date: Dec. 3, 2021

(87) PCT Pub. No.: WO2020/245604
PCT Pub. Date: Dec. 10, 2020

(65) Prior Publication Data
US 2022/0237276 A1 Jul. 28, 2022

(30) Foreign Application Priority Data
Jun. 5, 2019 (GB) .................................. 1907998
Jun. 5, 2019 (GB) .................................. 1908040
(Continued)

(51) Int. Cl.
G06F 3/041 (2006.01)
G06F 3/0354 (2013.01)
(Continued)

(52) U.S. Cl.
CPC .......... *G06F 21/32* (2013.01); *G06F 3/03543* (2013.01); *G06F 3/03547* (2013.01);
(Continued)

(58) Field of Classification Search
CPC .. G06F 21/32; G06F 3/03543; G06F 3/03547; G06F 3/041661; G06F 3/044;
(Continued)

(56) References Cited

U.S. PATENT DOCUMENTS 9,465,491 B2 10/2016 Shaikh et al.
2002/0067334 A1 6/2002 Hinckley et al.
(Continued)

FOREIGN PATENT DOCUMENTS

CN 205091713 U 3/2016
CN 105528592 4/2016
(Continued)

OTHER PUBLICATIONS

Examination Report issued on Nov. 13, 2023 in EP Appl. No. 20739761.3.
(Continued)

*Primary Examiner* — Jonathan A Boyd
(74) *Attorney, Agent, or Firm* — Barnes & Thornburg LLP

(57) ABSTRACT

Disclosed herein is a pointing device for controlling the position of a pointer in a graphical user interface, GUI, of a computer. The device comprises: an operation interface for sensing operation by an operator of the device for controlling the pointer in the GUI, and a biometric skin-contact sensor configured to obtain biometric identifier data, for identifying the operator, by sensing contact of surface contours of the operator's skin. The biometric skin-contact sensor is a contact surface of the operation interface con-
(Continued)

figured to obtain the biometric identifier data during the operation to control the pointer.

20 Claims, 13 Drawing Sheets

(30) Foreign Application Priority Data

Jun. 26, 2019 (GB) ..................................... 1909209
Sep. 26, 2019 (GB) ..................................... 1913912

(51) Int. Cl.
*G06F 3/044* (2006.01)
*G06F 21/32* (2013.01)
*G06F 21/44* (2013.01)
*G06V 40/12* (2022.01)
*H01L 27/12* (2006.01)
*G06V 40/13* (2022.01)

(52) U.S. Cl.
CPC ........ *G06F 3/041661* (2019.05); *G06F 3/044* (2013.01); *G06F 3/0446* (2019.05); *G06F 21/44* (2013.01); *G06V 40/1359* (2022.01); *H01L 27/1255* (2013.01); *H01L 27/127* (2013.01); *G06F 2203/0336* (2013.01); *G06V 40/1306* (2022.01); *H01L 27/1218* (2013.01)

(58) Field of Classification Search
CPC .................. G06F 3/0446; G06F 21/44; G06F 2203/0336; G06F 2203/0338; G06F 3/033; G06V 40/1359; G06V 40/1306; G06V 40/11; H01L 27/1255; H01L 27/127; H01L 27/1218
See application file for complete search history.

(56) References Cited

U.S. PATENT DOCUMENTS

| | | | |
|---|---|---|---|
| 2002/0117694 A1 | 8/2002 | Migliorato et al. | |
| 2002/0122026 A1 | 9/2002 | Bergstrom | |
| 2004/0247163 A1 | 12/2004 | Hara | |
| 2005/0012714 A1* | 1/2005 | Russo | G06F 3/033 |
| | | | 345/157 |
| 2005/0077911 A1 | 4/2005 | Miyasaka | |
| 2005/0078856 A1 | 4/2005 | Miyasaka et al. | |
| 2006/0076963 A1 | 4/2006 | Miyasaka | |
| 2007/0216647 A1* | 9/2007 | Yuan | G06F 3/03543 |
| | | | 345/163 |
| 2008/0030302 A1 | 2/2008 | Franza et al. | |
| 2009/0278810 A1 | 11/2009 | Ma | |
| 2011/0063238 A1 | 3/2011 | Liu et al. | |
| 2011/0118029 A1 | 5/2011 | Lukas et al. | |
| 2012/0026117 A1 | 2/2012 | Schneider et al. | |
| 2012/0121143 A1* | 5/2012 | Lee | G06V 40/1324 |
| | | | 382/125 |
| 2013/0028727 A1 | 10/2013 | Shi et al. | |
| 2013/0287274 A1 | 10/2013 | Shi et al. | |
| 2014/0077827 A1 | 3/2014 | Seguine | |
| 2014/0266262 A1 | 9/2014 | Taghibakhsh | |
| 2014/0333328 A1* | 11/2014 | Nelson | G06F 3/0416 |
| | | | 324/663 |
| 2015/0049046 A1 | 2/2015 | Tan | |
| 2015/0070137 A1 | 3/2015 | Minteer et al. | |
| 2016/0034739 A1 | 2/2016 | Chin | |
| 2016/0098140 A1 | 4/2016 | Lee et al. | |
| 2016/0328593 A1 | 11/2016 | Ho | |
| 2016/0364591 A1 | 12/2016 | El-Khoury | |
| 2017/0006245 A1 | 1/2017 | Akhavan et al. | |
| 2017/0140194 A1 | 5/2017 | Qin et al. | |
| 2017/0140201 A1 | 5/2017 | Li et al. | |
| 2017/0336906 A1 | 11/2017 | Yoon et al. | |
| 2017/0344141 A1 | 11/2017 | Lee | |
| 2018/0025203 A1 | 1/2018 | Lee et al. | |
| 2018/0210578 A1 | 7/2018 | Won et al. | |
| 2018/0314363 A1 | 11/2018 | Yoon et al. | |
| 2019/0369799 A1 | 12/2019 | Jeon et al. | |

FOREIGN PATENT DOCUMENTS

| | | | |
|---|---|---|---|
| EP | 1469416 | 10/2004 | |
| EP | 1058924 | 6/2012 | |
| WO | 99/38149 | 7/1999 | |
| WO | 01/59558 | 8/2001 | |
| WO | 2004/036484 | 4/2004 | |
| WO | 2018/124334 | 7/2018 | |
| WO | 2018/222866 | 12/2018 | |
| WO | WO-2018222866 A1 * | 12/2018 | ............. G06F 21/32 |

OTHER PUBLICATIONS

Examination Report issued in EP Appl. No. 20739761.3 (Oct. 13, 2023).
Third Party Observations issued in GB2008496.8 (Dec. 17, 2021).
Search & Exam Report issued in Appl. No. GB1908040.7 (Jul. 30, 2019).
Search & Exam Report issued in Appl. No. GB1907998.7 (Aug. 6, 2019).
Search & Exam Report issued in Appl. No. GB2008506.4 (Oct. 30, 2020).
Search Report & Written Opinion issued in Appl. No. PCT/GB2020/051371 (Dec. 11, 2020).
Office Action issued in U.S. Appl. No. 18/531,979, filed Jun. 24, 2024.

* cited by examiner

POINTING DEVICE WITH BIOMETRIC SKIN-CONTACT SENSOR, AND CORRESPONDING METHOD

CROSS-REFERENCE TO RELATED APPLICATIONS

This application is a US National Stage Application under Section 371 of PCT/GB2020/051371, filed on Jun. 5, 2020, which claimed priority from the following four (4) United Kingdom patent applications: 1907998.7, filed on Jun. 5, 2019; 1908040.7, filed on Jun. 5, 2019; 1909209.7, filed on Jun. 26, 2019; and 1913912.0, filed on Sep. 26, 2019, the entirety of each are hereby fully incorporated by reference herein.

TECHNICAL FIELD

The present disclosure relates to the field of pointing devices for controlling the position of a pointer on a graphical user interface of a computer.

BACKGROUND

Secure, verifiable authentication, of user identity is an increasingly important part of all technology. To give just a few examples, it plays a part in:
- user equipment (UE) used for communication and consumer access to media content,
- computer devices and systems which store and provide access to sensitive data,
- devices and systems used for financial transactions,
- access control for buildings, and
- access control for vehicles.

Biometric measurement of the user is now prevalent in all of these contexts and others. Biometric measures such as iris scanning, and facial recognition are dependent on lighting and field of view of a camera. It may also be possible to circumvent such security measures by presenting a video or photo of the user to the camera.

Fingerprint sensors have been thought of as being more secure, but it is possible also to overcome the security they provide, and the manufacturing requirements of such sensors makes it difficult to integrate them into other electronic devices such as mobile telephones and other UEs. In particular, fingerprint sensing demands very high resolution—at least hundreds of pixels per inch.

One example of such a sensor is Apple Inc's Touch ID®. This sensor is based on a laser-cut sapphire crystal. It uses a detection ring around the sensor to detect the presence of the user's finger. The Touch ID (RTM) sensor uses capacitive touch sensing to detect the fingerprint, and has a 500 pixel per inch (PPI) resolution.

Capacitance sensors such as these use capacitive effects associated with the surface contours of the fingerprint. The sensor array pixels each include an electrode which acts as one plate of a capacitor, the dermal layer (which is electrically conductive) acts as the other plate, and the non-conductive epidermal layer acts as a dielectric. The capacitance is greater where the dermis is closer to the pixel electrode, and so the surface contours of the skin can be sensed by measuring the capacitance of each pixel (e.g. based on the charge accumulated on the pixel electrode) and assembling an image from those pixels.

Both passive matrix and active matrix capacitive touch sensors have been proposed. Most so-called passive capacitive touch sensing systems use an external driving circuit (such as an integrated circuit, IC) to drive a matrix of passive electrodes, and a separate readout circuit (e.g. an IC) to readout charge stored on these electrodes during the drive cycle. The stored charge varies dependent on the tiny capacitance changes due to touch events. Passive electrode systems are sensitive to environmental noise and interference.

Active matrix capacitive touch sensors include a switching element in each pixel. The switching element may control a conduction path between the capacitive sensing electrode in the pixel, and an input channel to an analogue to digital converter (ADC) in a read-out circuit. Typically each column of pixels in an active array is connected to one such input channel. The charge stored in the array can thus be read from the active matrix by controlling the switching elements to connect each row of pixels, one-by-one, to the ADC.

Each pixel needs to be connected to the read-out circuit, and all of the pixels of each column are effectively connected in parallel. The parasitic capacitance associated with each pixel therefore combines additively. This places an inherent limit on the number of pixels that can be combined together in any one column. This in turn limits the size and/or resolution of a capacitive touch sensor.

There thus remains a significant unmet commercial need for large area high resolution touch sensors.

SUMMARY

As set out above, there are numerous advantages available if a large area high resolution touch sensor could be manufactured. The present inventors have devised such enabling technology, which is also described in pending patent applications GB1903093.1 and GB1907998.7. In particular, such technology enables the provision of a large area high resolution biometric skin-contact sensor which may be formed on either a planar or curved substrate. The present inventors have also identified that this new technology may find particular application in the field of pointing devices for computers, such as computer mice and touchpads. The inclusion of a large area biometric skin-contact sensor in a pointing device may enable both greater functionality for that device, and greater security associated with operation of that device and any computer it is connected to.

Aspects of the disclosure are set out in the independent claims and optional features are set out in the dependent claims. Aspects of the invention may be provided in conjunction with each other, and features of one aspect may be applied to other aspects.

In an aspect, there is provided a pointing device for controlling the position of a pointer in a graphical user interface ('GUI') of a computer. The device comprises: (i) an operation interface for sensing operation by an operator of the device for controlling the pointer in the GUI; and (ii) a biometric skin-contact sensor configured to obtain biometric identifier data, for identifying the operator, by sensing contact of surface contours of the operator's skin. The biometric skin-contact sensor is a contact surface of the operation interface configured to obtain the biometric identifier data during the operation to control the pointer.

Embodiments may enable the provision of an improved pointing device for a computer. This may be in terms of improved security and/or improved functionality for the device. As to security, the biometric skin-contact sensor may obtain biometric identifier of the operator to enable identification of the operator. This identification based on skin contours of the operator may be used for authorisation purposes when using the computer. This may be more secure than password protection, and/or may be quicker as authorisation may occur based on interaction between the operator and the device, for example their manual operation (e.g. manipulation) of the device to control the pointer. As to functionality, control of the pointer in the GUI may be based on biometric identifier data. This may provide an additional stream of input data from the pointing device which may be used to control the GUI. More options for controlling the pointer/the GUI may be available depending on how the operator interacts with the operation interface of the device, e.g. which region or regions of their anatomy are in contact with the device.

Embodiments may enable the provision and application of a contiguous or non-contiguous self-capacitance fingerprint sensor for 2D and 3D surfaces of a pointing device such as a mouse and/or a touchpad. The biometric skin-contact sensor may operate as a biometric identity detector and as such may allow the operator to access the computer without the need for a separate log-in identifier step. The device may allow access to all programs, applications and services on the computer without the need for a separate identifying step. This may be achieved by recognising the operator through the biometric identification of the operator through the biometric skin-contact sensor incorporated into the pointing device. The biometric skin-contact sensor may incorporate the ability for finger(s) gesture recognition or finger pressure recognition such that functionality such as scrolling can be incorporated without the need for a mechanical device, such as being provided by a touch sensitive surface which also provides the biometric skin-contact sensor. For example, scrolling may be identified based on a particular type of engagement between the operator and the device, such as dragging two fingers together across the screen.

Identifying the operator may comprise obtaining identifier data which is associated with the operator. This identifier may be compared with known data to determine the operator and/or any permissions associated with the operator. Identifying the operator may also comprise identifying which part of the operator's anatomy is in contact with the pointing device. By determining which part of the operator's anatomy is being used to control the device, different actions may be performed on the GUI based on the determined part of the anatomy. The device may determine the selected action based on obtained biometric identifier indicating which part of the operator's anatomy is in contact with the device. For example interaction between the device and a different region on an operator's hand may provide different commands to the GUI such as scroll, zoom, escape, enter.

For authorisation purposes, different levels of permission may be associated with an operator based on their biometric identifier data. For example, this may be provided as an alternative or an addition to other permission-based security measures such as password protection. Operator's may have different permissions which are associated with their biometric data so that e.g. selected actions or files may only be accessed if the operator is determined, via the pointing device, to have the relevant permissions (e.g. access control) associated with their biometric identifier data.

Sensing operation of the device may include detecting an indication that the device is either in use, or is intended to be in use. For example, this may be detected if an operator starts (or continues) interacting with the device. Sensing operation may comprise sensing a movement parameter (e.g. acceleration/speed/displacement) greater than a threshold value. Sensing operation may comprise sensing a pressure on the pointing device above a threshold, e.g. as measured by a pressure sensor on the device, and/or based on the size of contact area as described below. For example, pressure sensing using the biometric skin-contact sensor may avoid use of additional componentry, such as a pressure sensor. Sensing operation may comprise sensing capacitance with the device, e.g. if the operator comes into contact with the device, some capacitance may be measured. This can be based on a single capacitance, or based on the combined capacitances of multiple pixels.

Biometric identifier data may comprise data representative of skin surfaces or contours of operators of the device. For example, biometric identifier data may be previously obtained data from a/the biometric skin-contact sensor which is associated with a known operator. The contact surface of the operation interface may comprise a region of pointing device with which an operator interacts when using the pointing device.

The pointer on the GUI may vary in size depending on a selected functionality for that pointer. For example a graphical interface unit, a finer pointer may be used. Interaction between the operator and the pointing device may be used to control the size of the pointer and/or to control other functionality of the pointer. For example, the precision of the pointer may be controlled and/or its effect/interaction with the computer may be controlled. Which functionality to provide may be determined based on biometric identifier data which identifies which part(s) of the operator's anatomy is in contact with the pointing device.

The operation interface may be provided by a touch sensitive surface. The apparatus may comprise a controller configured to: (i) identify a contact location of the operator's skin on the touch sensitive surface, and (ii) control both (a) the biometric skin-contact sensor and (b) the pointer, based on (c) the contact location. The controller may be provided by the computer to which the pointing device is connected to, it may be provided by the pointing device and/or it may be provided by an additional external component with which the pointing device may communicate (e.g. send and receive signals). Embodiments may enable greater functionality and/or security of the computer when using the pointing device.

The controller may be configured to: (i) identify the contact location by operating the touch sensitive surface at a first resolution thereby to control the pointer, and (ii) obtain the biometric identifier data by operating the touch sensitive surface at a second resolution, higher than the first resolution. The controller may be configured to select a region of the touch sensitive surface to be operated at the second resolution based on the contact location. For example, a smaller region of the device may be operated at a higher resolution. Embodiments may enable a more energy-efficient pointing device as higher resolution operation of the pointing device is confined to regions of the device with which the operator is interacting. These regions may be further limited to those with which it is expected that the operator is likely to interact intentionally with (as opposed to accidental contact regions). Further resolutions may also be provided. For example, a higher resolution may be provided which is at a higher resolution than the second resolution. The higher resolution may be used when operating the GUI to perform functionality which may require higher resolution, e.g. when using the GUI for graphic design or other functions which may benefit from high resolution control such as clicking/scrolling accuracy. A middle resolution may be provided which is in between the first resolution (or a resolution when the pointing device is left idle) and the second resolution. For example, in the middle resolution, the pointing device may be controlled to control the pointer on the GUI when resolution demands are lower than those required to identify biometric identifier data of the operator.

The operation interface may comprise a movement sensor for sensing movement of the device for controlling the position of the pointer based on movement of the device. The operation interface may comprise a scroll sensor for causing scrolling in the GUI. The scroll sensor may comprise the biometric skin-contact sensor. Embodiments may enable the provision of a pointing device without the need for a separate component included to provide scrolling functionality.

The apparatus may comprise a controller configured to identify, based on the biometric identifier data, a predefined anatomical location on the operator's skin and to control the GUI based on the predefined anatomical location. The predefined anatomical location may be determined based on previously obtained biometric identifier data associated with each said predefined anatomical location on the operator's skin. Interaction with different predefined anatomical locations may provide a different functionality on the computer. Controlling the GUI based on the predefined anatomical location may comprise controlling the GUI based on a predefined anatomical shape. The predefined anatomical shape may be based on a number of different anatomical locations of the operator, such as different regions and/or fingers on their hand. The predefined anatomical shape may provide an indication of details of the hand of the operator which is interacting with the device, e.g. an indication of their grip on the device.

The controller may be operable to differentiate between at least two of said predefined locations on the operator's skin. The controller may be operable to select between corresponding control actions (e.g. to decide which action to take) based on the predefined location identified by the biometric identifier data. The controller may be operable to identify the operator based on a distribution of pressure being applied to the pointing device by the operator, such as a grip associated with the operator. For example the grip may be defined by distances between recognised anatomical landmarks (such as patterns of skin contours). In addition or as an alternative, the shape and size of the contact areas associated with each of these landmarks may also be used for this purpose. As described below in relation to pressure sensing, the size of the contact area between the operator and the device may be used to determine the strength of their grip. The controller may be able to identify the operator based on their grip. For example this may be based on at least one of: (i) the geometric relationship between different areas of the operator's anatomy in contact with the device, (ii) the shape and/or size of said areas, (iii) biometric identifier data associated with at least one of said areas.

The controller may be operable to determine the operator based on pressure being applied by the operator in different regions of the pointing device in combination with biometric identifier data. The predefined locations may comprise finger tips, such as to identify at least one of the index finger, middle finger or thumb of an operator. Predefined locations for a mouse may include the index finger and middle finger. However, it is to be appreciated that the predefined locations may comprise any suitable anatomical region which interacts with the pointing device during normal use. For example, during use of a mouse, regions of an operator's anatomy in contact with the mouse may also include at least one of: their thumb, the palm of their hand, mid-finger regions, ring and little fingers.

The biometric skin-contact sensor may be arranged to identify a difference in capacitance associated with valley and region regions in the operator's skin. The contours of an operator's skin include ridges which, when pressed against the skin-contact sensor, will be closer to the sensor than the corresponding valleys. The skin-contact sensor may be arranged to detect a difference in observed capacitance based on the closeness between an electrode of the sensor and the operator's skin in that region. Based on observed differences in capacitance as a result of the difference in distance between the operator's skin and the sensor, a profile of skin contours for an operator can be determined. This profile may then be compared to known profiles to determine the identity of the operator. It is to be appreciated in this context that skin-contact sensors operate based on a relative distance of different portions of an operator's skin from an electrode of the sensor.

The biometric skin-contact sensor may comprise a TFT array disposed on an inside surface of a dielectric which provides at least a part of the operation interface. Each pixel of the TFT array may comprise a capacitive sensing electrode for sensing skin-contact with an outside surface of the dielectric. The capacitive sensing electrode may be disposed on the inside surface of the dielectric. Each pixel may comprise a sense TFT. The capacitive sensing electrode may be connected to a gate electrode of the sense TFT. Each capacitive sensing electrode may be provided by a first metal layer of a thin film structure. The first metal layer may be disposed between capacitive sensing electrode and at least one TFT of each pixel. The dielectric may be at least one of (a) flexible, and (b) curved. The dielectric may provide a cover layer for the TFT stack and the capacitive sensing electrode, such that the dielectric lies between said components and a contact surface for contact by the operator. Interaction between the operator and the biometric skin-contact sensor may therefore comprise contact with the dielectric of the skin-contact sensor. The TFT stack may be provided on a substrate, which may itself be provided by a dielectric material. The substrate may be formed of the same dielectric material as the dielectric. The substrate may provide the contact surface for contact by the operator. For example, a TFT stack may be deposited on the substrate/contact surface.

For example, the biometric skin-contact sensor may comprise a sensor array which comprises a plurality of touch sensitive pixels. Each pixel comprises: a capacitive sensing electrode for accumulating a charge in response to proximity of a conductive object to be sensed; a reference capacitor connected in series with the capacitive sensing electrode so that, in response to a control voltage, an indicator voltage is provided at the connection (18) between the reference capacitor and the capacitive sensing electrode to indicate the proximity of the conductive object to be sensed. This arrangement may reduce or overcome the problem associated with parasitic capacitance which may occur in prior art touch sensors.

Each pixel may comprise a sense VCI (voltage controlled impedance) having a control terminal connected so that the impedance of the sense VCI is controlled by the indicator voltage. Typically the sense VCI comprises at least one TFT (thin film transistor) and the conduction path of the VCI comprises the channel of the TFT. A conduction path of the sense VCI may be connected to a first plate of the reference capacitor, and the control terminal of the first VCI is connected to the second plate of the reference capacitor. At least one plate of the reference capacitor may be provided by a metallisation layer of a thin film structure which provides the sense VCI.

The conduction path of the sense VCI may connect the first plate of the reference capacitor, and so also the control voltage, to an input of a readout circuit. This may enable the circuitry which provides the control voltage also to provide the basis for the output signal of the pixel. This may further address problems associated with parasitic capacitance and signal to noise ratio in prior art touch sensors. An alternative way to address this same problem is to arrange the conduction path of the sense VCI to connect a reference signal supply to an input of a readout circuit. The reference signal supply may comprise a constant voltage current source. Thus, modulating the impedance of the sense VCI of a pixel controls the current from that pixel to the input of the read-out circuit.

A select VCI may also be included in each pixel. This may be connected so that its conduction path is connected in series between the conduction path of the sense VCI and the reference signal supply. Thus, switching the select VCI into a non-conducting state can isolate the sense VCI from the reference signal input, whereas switching the select VCI into a conducting state can enable current to flow through the pixel (depending on the impedance of the sense VCI). A control terminal of the select VCI may be connected for receiving the control voltage, e.g. from a gate drive circuit.

Each pixel may comprise a gate line VCI, and a conduction path of the gate line VCI may connect the reference signal supply to the first plate of the reference capacitor for providing the control voltage.

Each pixel may comprise a reset circuit for setting the control terminal of the sense VCI to a selected reset voltage. The reset circuit may comprise a reset VCI. A conduction path of the reset VCI is connected between a second plate of the reference capacitor and one of (a) a reset voltage; and (b) a first plate of the reference capacitor. A control terminal of the reset VCI may be connected to another pixel of the sensor for receiving a reset signal (e.g. from a channel of a gate drive circuit which is connected to the control terminal of the select VCI of a pixel in another row of the array). The reset signal may be configured to switch the reset VCI into a conducting state, thereby to connect the second plate of the reference capacitor to the one of (a) the reset voltage and (b) the first plate of the capacitor. Connecting the second plate of the reference capacitor to the one of (a) the reset voltage.

For example, the sensor array comprising a plurality of touch sensitive pixels may be made up of pixels having a pixel structure comprising a plurality of layers for providing a touch sensitive pixel. Each said pixel may comprise: a thin film transistor; and a capacitive sensing electrode coupled to the thin film transistor and disposed on a dielectric shield to be touched by an object to be sensed. The dielectric shield may provide a substrate on which the layers of the structure are disposed; for example the dielectric shield may be the substrate. The capacitive sensing electrode may be deposited on the substrate. The dielectric shield may comprise a first surface to be touched by the object to be sensed. The capacitive sensing electrode may be disposed on a second surface of the dielectric shield.

An insulating layer may separate the capacitive sensing electrode from the thin film transistor. The insulating layer between the capacitive sensing electrode and the thin film transistor may act to avoid shorting between the two features, and can provide the insulating layer of the capacitor that forms the capacitive sensing electrode.

The capacitive sensing electrode may be connected to the thin film transistor by a conductive via through the insulating layer. The via advantageously provides an electrical connection between the layers of the pixel, in particular it may provide a connection between the capacitive sensing electrode and an element of the thin film transistor.

A source-drain layer of the pixel structure may comprise a source region and a drain region of the thin film transistor. The source-drain layer can be a metalized, conductive layer. The source and drain regions may comprise islands of the deposited metal, and may be simultaneously deposited. Simultaneous deposition maintains that the material of the source-drain layer is constant and aids simplicity of manufacturing. Patterning can be used to ensure the source and drain regions are separate.

The pixel may further comprise a channel region comprising a semiconductor, which connects the source region and the drain region of the thin film transistor in an "on" state. The channel region may be referred to as an active region. In an "off" state, i.e. when there is no current applied to the pixel, the source and drain regions remain ohmically unconnected by virtue of the channel region.

The source-drain layer may connect to an output of the pixel. This may be a data line or a source line such that the pixel can be addressed.

The pixel structure may further comprise a gate layer of the pixel structure comprising a gate region of the thin film transistor. This may be a second metalized, conductive layer. The gate layer may be separated from the source-drain layer and the channel region by a gate-insulator layer disposed between the gate layer and the channel region. Thus, the TFT may comprise a source-drain region, an active region provided by the channel region, a gate-insulator layer and a gate region.

The gate layer may be disposed between the capacitive sensing electrode and the source-drain layer, for example, in a bottom gate arrangement. Or, the source-drain layer may be disposed between the capacitive sensing electrode and the gate layer in a top gate arrangement. Either arrangement can be used, the difference between the two is the method of manufacture, there is little functional difference between the two configurations.

The conductive via may connect the capacitive sensing electrode to the TFT.

The pixel structure may further comprise a reference capacitor. A reference capacitor can be connected in series with the capacitive sensing electrode so that, in response to a control voltage, an indicator voltage is provided at the connection between the reference capacitor and the capacitive sensing electrode to indicate the proximity of the conductive object to be sensed. This arrangement may reduce problems associated with parasitic capacitance which may occur in prior art touch sensors. The reference cap may further enable touch capacitive measurement.

The pixel structure comprising a reference capacitor may be arranged such that at least one of the source-drain layer and the gate layer are arranged to provide a plate of the reference capacitor. To complete the circuitry of an individual pixel, such that it may be individually addressed, the reference capacitor plates can be arranged to be integrated by virtue of simultaneous deposition with the metalized layers of the TFT.

In an aspect, there is provided a method of controlling a graphical user interface, GUI, of a computer. The method comprises: (i) sensing operation by an operator of a operation interface of a pointing device for controlling a pointer in the GUI wherein the pointing device comprises a contact surface comprising a biometric skin-contact sensor; and (ii) in response to said sensing, operating the biometric skin-contact sensor to obtain biometric identifier data, suitable for identifying the operator, by sensing contact of surface contours of the operator's skin with the contact surface.

Embodiments may enable the provision of improved methods for controlling a GUI of a computer. This may be in terms of improved security and/or improved functionality for the method. The method may comprise controlling the pointer in the GUI and/or controlling the computer based on biometric identifier data obtained by the biometric skin-contact sensor during operation of the device by the operator.

The biometric identifier data may be obtained from the contact surface during the operation to control the pointer. For example, it may be obtained during use of the operation device for controlling the GUI.

The operation interface may comprise a touch sensitive surface for controlling the pointer, and the method may comprise: (i) identifying a contact location of the operator's skin on the surface, (ii) controlling the pointer based on the contact location; and (iii) activating a region of the touch sensitive surface to provide the biometric skin-contact sensor. The region may be selected based on the contact location. The method may comprise identifying the contact location to control the pointer by operating the touch sensitive surface at a first resolution. The method may comprise obtaining the biometric identifier data by operating the touch sensitive surface in the activated region at a second resolution, higher than the first resolution.

The method may comprise identifying an anatomical location of the operator's skin based on the biometric identifier data. The method may comprise controlling the GUI based on the anatomical location. Identifying an anatomical location may comprise differentiating between fingers of the operator's hands. The hand being used by the operator, e.g. the hand in contact with the pointing device, may be determined. The method may comprise selecting between a plurality of control actions based on the anatomical location. It may comprise determining a surface area of the operator's skin in contact with the biometric skin-contact sensor, and controlling the GUI based on the surface area and the anatomical location. It may comprise controlling a scrolling function of the GUI based on the biometric identifier data.

In an aspect, there is provided a pointing device for controlling the position of a pointer in a graphical user interface, GUI, of a computer. The device comprises: (i) an operation interface for sensing operation by an operator of the device for controlling the pointer in the GUI; and (ii) a biometric skin-contact sensor configured to obtain biometric identifier data, for identifying the operator, by sensing contact of surface contours of the operator's skin. The device is operable to provide an output signal indicative of which of the operator's hands is operating the device based on obtained biometric identifier data from the biometric skin-contact sensor.

Based on stored biometric identifier data the device may be operable to determine whether a region of the operator's anatomy in contact with the operation interface belongs to their right hand or their left hand. Control of the GUI and/or computer may be based on this determination. For example, the left and right clicks on a right handed mouse—e.g. as by the index and middle fingers may be swapped for the left handed mouse, so that a 'left button' press is triggered by the operator pressing the device with their index finger (which would be located on the right hand side of the mouse as compared to their middle finger). Accordingly, the left hand middle finger press may perform 'right button' functionality. For example, two pointing devices may be provided for the operator to interact with, one for each hand.

Stored biometric identifier data may comprise biometric data for each hand. Different regions of each hand of the operator may have different skin contours to the corresponding region on their other hand. Based on this difference, the left and/or right hand of an operator may be identified based on obtained biometric identifier data. Based on the hand determined to be operating the device, the functionality provided by the device may be changed. For example, in response to determining that an operator is using a selected hand, the device may provide output signals in accordance with a mapping which maps input (the operator's interaction with the mouse) to the appropriate output (the relevant right/left hand action).

In an aspect, there is provided a method of controlling a graphical user interface, GUI, of a computer. The method comprises: (i) sensing operation by an operator of an operation interface of a pointing device for controlling a pointer in the GUI wherein the pointing device comprises a contact surface comprising a biometric skin-contact sensor; (ii) operating the biometric skin-contact sensor to obtain biometric identifier data, suitable for identifying the operator, by sensing contact of surface contours of the operator's skin with the contact surface; and (iii) controlling the pointer in the GUI based on which hand the operator is operating the pointing device with, wherein which hand operating the device is determined based on obtained biometric identifier data.

Aspects of the present disclosure may provide a computer program product configured to program a computer system to perform any of the methods disclosed herein.

FIGURES

Some embodiments will now be described, by way of example only, with reference to the figures, in which.

In the drawings like reference numerals are used to indicate like elements.

SPECIFIC DESCRIPTION

Embodiments of the present disclosure provide a pointing device for controlling a pointer on a graphical user interface. The pointing device includes a biometric skin sensor which enables operation of the pointing device to be based on not only movement of the pointing device, but also on biometric data obtained by the pointing device. Based on stored biometric identifier data for operators of the pointing device, it may be determined which operator is using the device and/or which region of an operator's anatomy was used to control the pointing device (e.g. which finger(s) they use). Control of the pointer and/or the GUI may be restricted based on which operator is identified as using the device. For example, for security reasons, biometric scanning may enable/prevent access to restricted material on a computer associated with the GUI. Operation of the pointer on the GUI may be controlled based on which region of an operator's anatomy is used to interact with the pointing device. For example, interaction of an operator's index finger with the pointing device may cause a different action to occur on the GUI than interaction using that operator's middle finger.

Figure 1A:
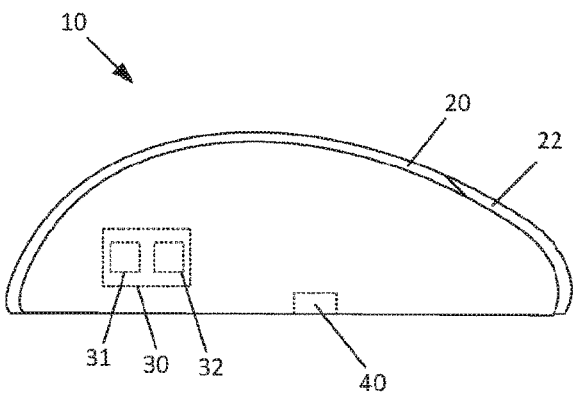
FIGS. 1a to 1f are schematic diagrams of a pointing device during different stages of use.
Figure 1B:
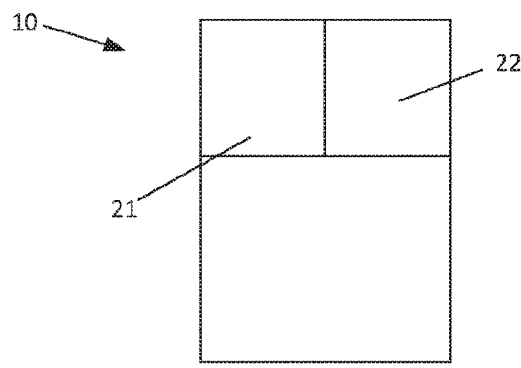

FIG. 1a shows a schematic diagram of a mouse 10 for a computer when viewed side on, and FIG. 1b shows a schematic diagram of the mouse 10 of Fig. 1a when viewed in plan.

A top surface of the mouse 10 is provided by a biometric skin-contact sensor 20. The mouse 10 includes a movement sensor 40, and a controller 30 comprising a data store 31 and processor 32. The mouse 10 also includes a left button 21 and a right button 22. The mouse 10 is connected to a computer (not shown) so that it can control a pointer on a GUI of the computer.

The biometric skin-contact sensor 20 covers the top surface of the mouse 10, and is arranged to obtain biometric identifier data for a hand placed on the mouse 10. The mouse 10 is shaped to fit inside a human hand so that a human operator can control movement of the mouse 10 to control the pointer on the GUI. The biometric skin-contact sensor 20 has the same shape as the top of the mouse 10.

The left and right buttons are each provided by a microswitch lying beneath the skin-contact sensor 20 in that region of the mouse 10—the left button 21 being at the front on the left and the right button 22 at the front on the right. For each of the left and right button, the skin-contact sensor 20 in the region above the respective microswitch is provided by a layer operable to move relative to the corresponding microswitch for that region. Pushing the layer in these regions will cause it to move towards the relevant microswitch, and to press said microswitch, thus providing a click of the mouse 10.

The data store 31 includes biometric identifier data for identifying operators of the mouse 10. The processor 32 is operable to access the data store 31 to compare biometric identifier data obtained by the biometric skin contact sensor 20 with biometric identifier data stored in the data store 31. The controller 30 is operable to determine that the hand of an operator on the mouse 10 corresponds to a known hand.

The controller 30 also retrieves additional data associated with the known hand of a known operator, such as security clearances for the computer associated with that operator.

The movement sensor 40 is an optical sensor which is arranged to determine whether the mouse 10 is moving relative to a surface on which it sits. The movement sensor 40 also determines a relative displacement of the mouse 10, so that the position of the pointer on the GUI can be controlled based on movement of the mouse 10.

Figure 1C:
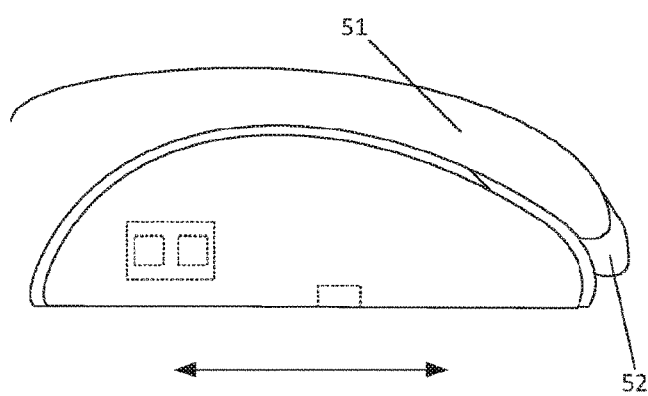
Figure 1D:
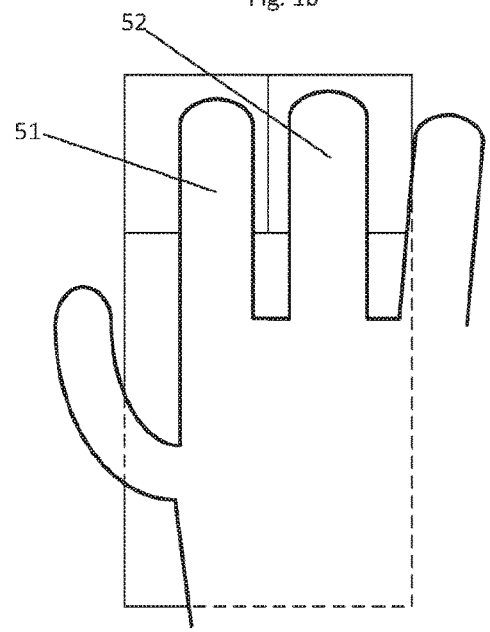

FIGS. 1c and 1d show the mouse 10 of FIGS. 1a and 1b when in use with a human operator. FIG. 1c is a side-on view, and FIG. 1d is a plan view.

The operator's hand includes an index finger 51 which is placed over the left button 21 when resting on the mouse 10. The operator's hand includes a middle finger 52 which is placed over the right button 22 when resting on the mouse 10. The majority of the operator's hand operating the mouse 10 will be in contact with the top surface of the mouse 10, and so will be in contact with the biometric skin-contact sensor 20. The biometric skin-contact sensor 20 is operable to obtain biometric identifier data for the regions of the operator's hand in contact with the mouse 10. Based on this obtained biometric identifier data, the controller 30 is operable to determine whether or not there is a match between the obtained biometric identifier data and stored biometric identifier data in the data store 31. Operation of the computer is then controlled based on whether or not there is a match.

In operation, when the operator intends to use the mouse 10, they will place their hand on the mouse 10 as shown in FIG. 1c. As shown by the arrow, this act will cause some movement of the mouse 10. This sort of movement can also be used to control the pointer on the GUI. The movement is detected by the movement sensor 40. Based on an indication of this movement, the controller 30 triggers operation of the biometric skin-contact sensor 20 to obtain biometric identifier data from the hand on the mouse 10. Thus, during an operator's normal interaction with the mouse 10, the mouse 10 also obtains biometric identifier data for that operator.

The obtained biometric identifier provides an additional stream of input data from the mouse 10. This data is used in a number of different ways.

One use of this data is for security measures such as for logging in to a computer or for accessing secure files. The controller 30 may determine whether or not obtained biometric identity data for the operator corresponds to stored biometric identity data associated with an operator having the required authentication credentials. If there is a match, and it is determined that the operator is authorised to access the secure files, then the computer is controlled to enable the operator to access the secure files. If this is not the case, the operator will not be able to access the files. This authorisation is performed based on normal operation of the mouse 10 by the operator, so that the operator placing their hand on the mouse 10 is enough to determine whether or not they are authorised and to unlock functionality of the computer and/or the GUI.

Another use of this additional stream of input data is to control operation of the pointer on the GUI based on which part of the operator's hand interacts with the mouse 10. The data store 31 stores biometric identifier data comprising data for multiple regions of the operator's hand. The controller 30 may compare the obtained biometric identifier data with stored biometric identifier data associated with regions of the operator's hand. Operation of the pointer on the GUI will be controlled based on which region of the operator's hand is in contact with the mouse 10, and the action that that region of the operator's hand is making. A 'left button' press may be performed based on determining that it is the operator's index finger pressing the mouse. A 'right button' press may be performed based on determining that it is the operator's middle finger pressing the mouse. A zooming function may be performed based on determining that the operator's index and middle fingers are in contact with the operation interface and are moving apart.

Figure 1E:
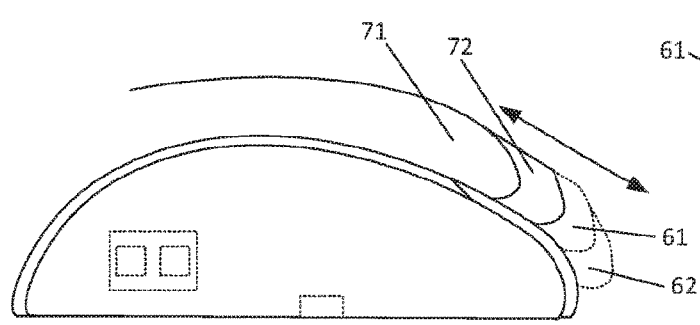
Figure 1F:
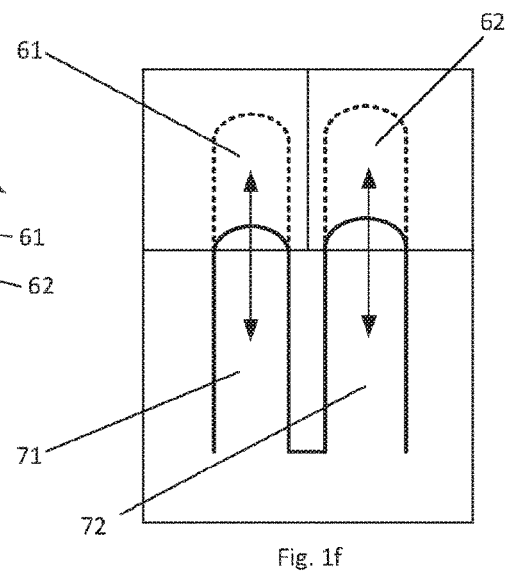

A scrolling function for the mouse 10 is performed based on obtained biometric identifier data. This is illustrated in FIGS. 1e and 1f. FIGS. 1e and 1f show the mouse 10 of FIGS. 1a and 1b when in use with a human operator. FIG. 1e is a side-on view, and FIG. 1f is a plan view.

In FIGS. 1e and 1f an initial index finger position 61 for the operator's index finger 51 is shown in dashed lines, as is an initial middle finger position 62 for the operator's middle finger 52. Also shown are a final index finger position 71 and a final middle finger position 72. The controller 30 is arranged to detect that the operator's index finger 51 and middle finger 52 are pressing against the biometric skin-contact sensor 20, and are being dragged along the surface of the sensor. This is determined by comparing data obtained from the skin-contact sensor 20 with stored biometric identifier data and identifying that the data obtained from the skin-contact sensor 20 corresponds to known data associated with the fingertips of the operator's index and middle fingers, and that they are making a dragging motion across the sensor.

In operation, it is determined that scrolling movement of the pointer on the GUI is intended based on the stored biometric identifier data and data obtained from the biometric skin-contact sensor 20. A scrolling function then occurs on the GUI.

The biometric skin-contact sensor 20 is provided by a touch sensitive screen to improve battery life. The touch sensitive screen is operable at a first (lower) resolution arranged for determining that the screen has been touched, and a second (higher) resolution arranged for providing the biometric skin-contact sensing of the operator's hand. When operating at the first resolution, the touch sensitive screen is arranged to output a signal indicating a touch of the screen and an indication of a contact region where the screen has been touched. The controller 30 is configured to receive such a signal and to control the screen to operate at the second resolution in the contact region. Thus, the higher power second resolution is only used when the screen is needed to operate as the biometric skin-contact sensor 20.

In operation, the controller 30 identifies that the device has been moved and that there is a contact location on the touch sensitive surface where an operator is touching the mouse 10. Based on received signals from the surface, the controller 30 activates the biometric skin-contact sensing functionality in the contact location so that biometric identifier is obtained from the contact location. As above, the controller 30 determines if the operator of the mouse 10 and the region of their hand in contact with the mouse 10 is known, and the pointer and GUI are controlled accordingly.

Described above with reference to FIG. 1 is a specific example of the technology. It will be appreciated that the technology has a more general application, and so a more general description will be made with reference to FIGS. 2 to 6.

Figure 2:
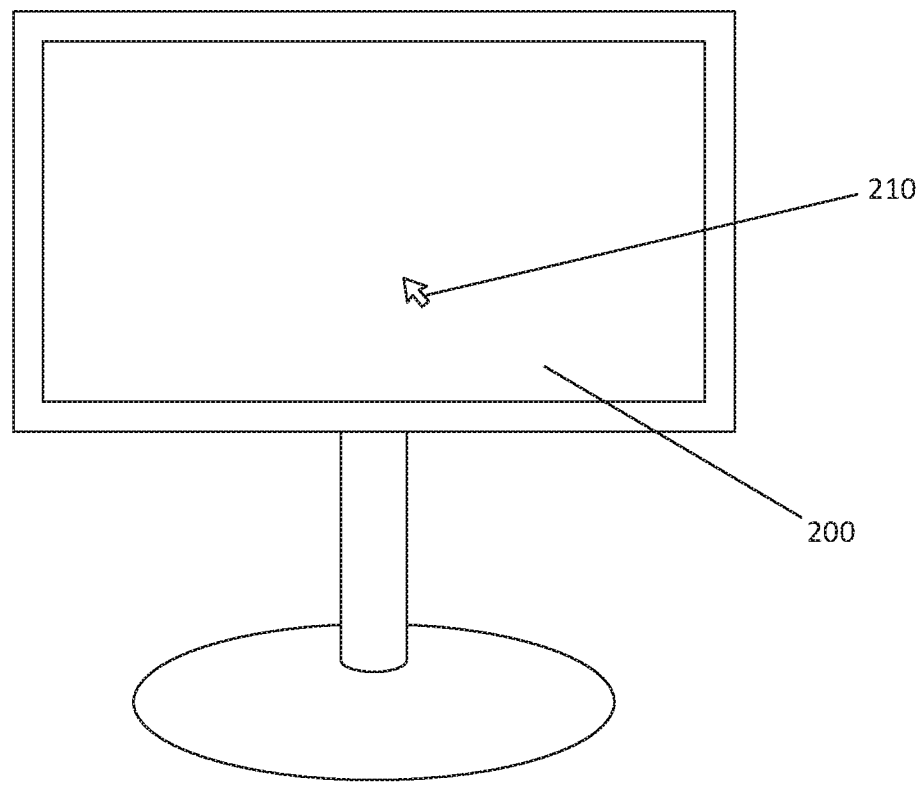
FIG. 2 is a schematic diagram of a pointing device and a computer system.
Figure 2:
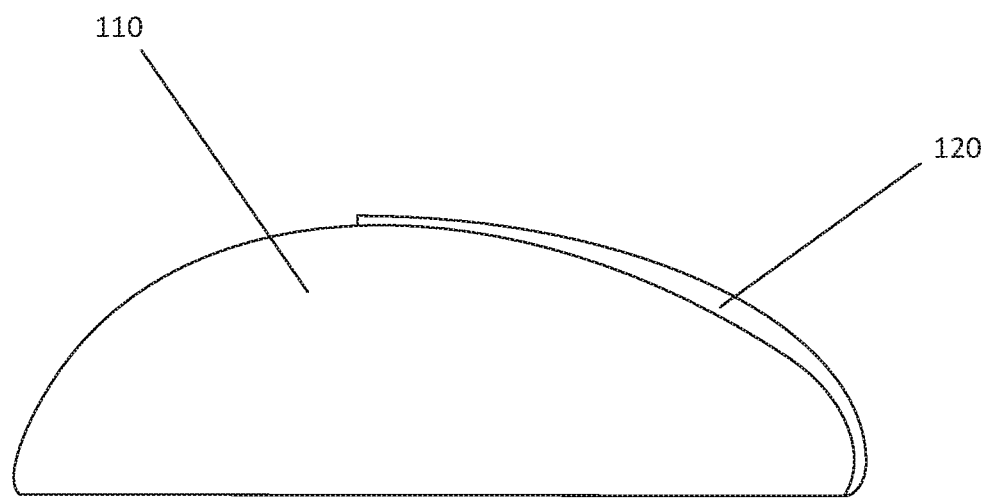

FIG. 2 shows a graphical user interface 'GUI' 200 with a pointer 210 on the GUI 200. The GUI 200 is part of a computer, although it will be appreciated that the pointer 210 and GUI 200 may feature in any suitable device. Also shown is a pointing device 110 which includes a biometric skin contact sensor 120.

The GUI 200 enables interaction between the operator and the computer itself. Operation of the pointing device 110 may enable an operator to control the pointer 210 to select features on the GUI 200, or to perform other functions such as scrolling (horizontally and/or vertically).

The pointing device 110 comprises a operation interface. The operation interface includes a portion of the pointing device 110 which is adapted for interaction with operators of the pointing device 110. For example, the operation interface may be an operator-facing portion of the device, such as a top surface of a mouse, or the entire pointing device 110. It is to be appreciated that the operation interface may be any suitable part of the pointing device 110 with which the operator may interact to control operation of the pointer 210. Based on different operation of the pointing device 110 (e.g. based on different operation of the operation interface), the pointer 210 may interact differently with the GUI 200. Different actions recorded by the pointing device 110 may result in different outcomes occurring by the pointer 210 on the GUI 200.

The pointing device 110 is shown as a wireless mouse. It is to be appreciated that any suitable pointing device 110, such as a joystick, a touchpad or a wired mouse, may be used. Other examples of pointing devices include a touch pen (such as for interaction with a pad to provide drawing/pinpoint functionality on the GUI). The touch pen may also include a scroll sensor, The upper surface of the mouse has a curved shape. It is arranged to interact with the hand of an operator of the mouse. The region of the mouse an operator would mainly interact with (e.g. towards a front end of the mouse, where the buttons/scrolling wheel would typically be) may be at least partially rounded, such as being predominantly not flat or planar.

The biometric skin-contact sensor 120 may also be curved, such as to follow the contours of the mouse. The operation interface of the mouse may comprise the top surface of the mouse. The biometric skin-contact sensor 120 may follow contours corresponding to those of the top surface of the mouse. The biometric skin-contact sensor 120 is shown as protruding above the top surface of the mouse, but it may also be embedded within a top surface of the mouse (e.g. so as to be flush with the top surface of the mouse). It is shown as covering a portion of the mouse, but not all of it. However, it will be appreciated that the biometric skin sensor may cover the whole of the mouse, a substantial portion of it, or it may be only in regions in which the operator typically interacts with the mouse. For example, the biometric skin-contact sensor 120 may cover a region great enough to receive more than one fingertip, such as covering a majority of a surface of the mouse with which an operator will interact. The biometric skin-contact sensor 120 may be made up of several disjointed portions. The biometric skin-contact sensor 120 may include at least one region in which it is non-planar, such as a region in which it bends or curves.

The biometric skin-contact sensor 120 may be provided by a touch sensitive surface. The biometric skin-contact sensor 120 is operable to identify a region of it with which an operator is engaging, such as a point or points at which an operator is applying pressure. The touch sensitive surface may be operable in at least two different modes. In a first mode, the touch sensitive surface may operate at a first resolution, and in a second mode, the touch sensitive surface may operate at a second resolution. The second resolution may be higher than the first resolution. It is to be appreciated that the second resolution may be more power consuming than the first resolution. The second resolution may enable greater accuracy or volume of data to be obtained than when using the first resolution. The touch sensitive surface may be arranged so that different portions of the surface may be operated at different resolutions. For example, the touch sensitive surface may provide biometric skin-contact sensing when operated at the second resolution, but it may not in the first resolution. Further resolutions may be provided and used. For example, a middle resolution of the device may be used once authorization processes associated with obtaining biometric identifier data for the operator have been finished. For example, the middle resolution may provide a resolution between the first and second resolutions which may not provide as accurate biometric identifying data as in the second resolution, but as such, consumes less power. A higher resolution may also be provided for very specific and precise use of the device 110. This may involve power consumption which is at a higher resolution than the second resolution. The pointing device 110 may be arranged to control operation to operate at the higher resolution in response to receiving an input signal from the computer.

Figure 3:
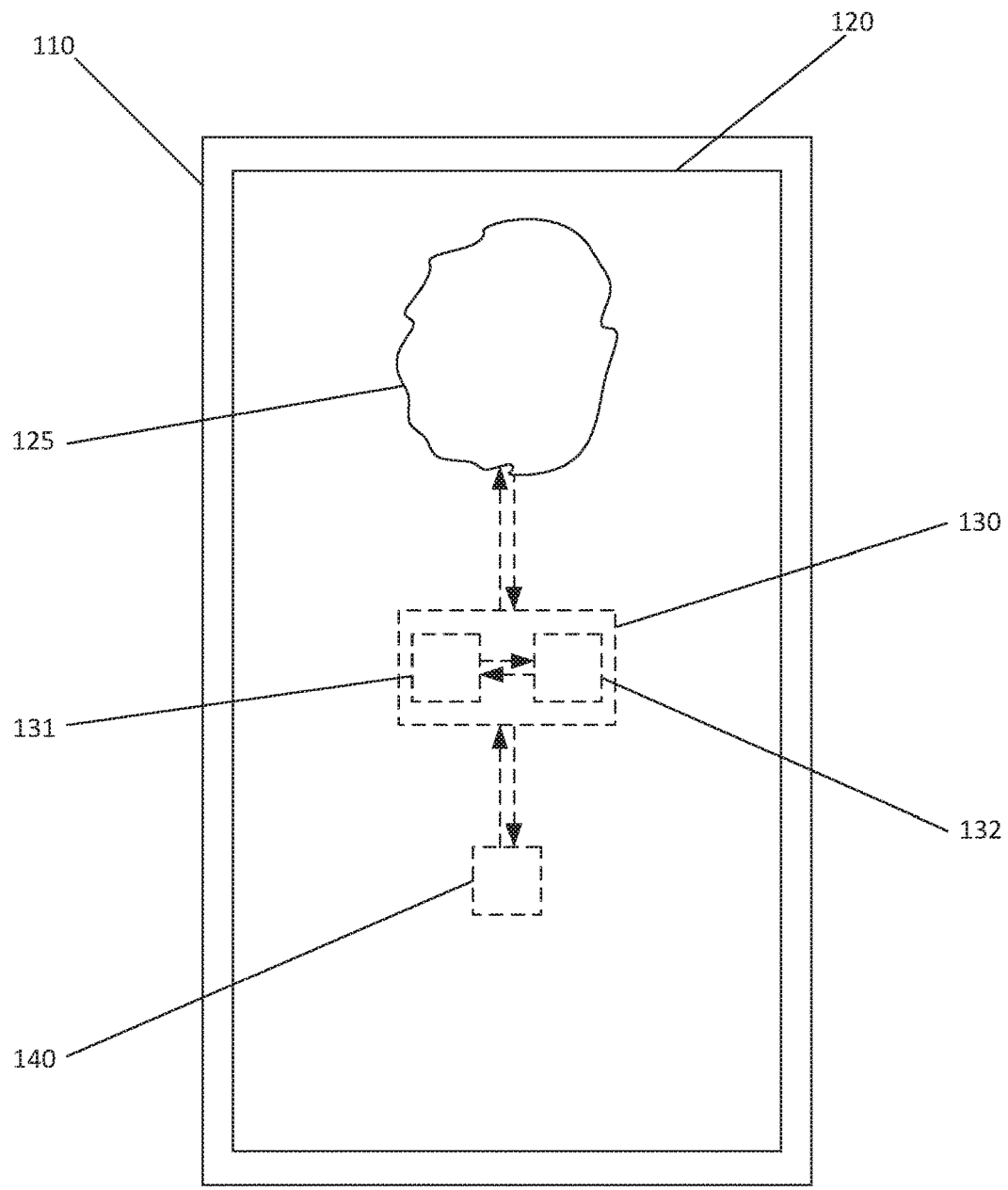
FIG. 3 is a schematic diagram of a pointing device when viewed in plan.

The pointing device 110 of FIG. 2 is shown in more detail in FIG. 3.

FIG. 3 shows a plan view of the pointing device 110 of FIG. 2. The pointing device 110 includes a biometric skin-contact sensor 120 covering a portion of the top surface of the pointing device 110. The device includes a scroll sensor 125. Also included, and shown in dashed lines as it may not be visible in plan, is a movement sensor 140. Likewise, a controller 130 is shown, which includes a data store 131 and a processor 132. The controller 130 is connected to both the measurement sensor and the scroll sensor 125.

The controller 130 is shown as a part of the pointing device 110, but it will be appreciated that some, or all, of the functionality provided by the controller 130 may be provided by an external component, e.g. one which is remote from the device. For example, the pointing device 110 may be configured for use with a computer and the computer may perform said processing based on signals received from the pointing device 110 at the computer.

The processor 132 is coupled to the data store 131 so that it may read data stored in the data store 131 and it may write data to the data store 131. The data store 131 may store data such as biometric identifier data. The biometric identifier data may be associated with operators of the device. For example, identifier data may be associated with an operator and an access level for that operator, such as whether or not that operator may access certain elements on the computer. The biometric identifier data may also be associated with different anatomical regions of the operator. For example identifier data may be associated with a finger/fingertip of an operator and/or regions of an operator's finger. The identifier data may enable the processor 132 to distinguish between different fingers of an operator of the device. Based on signals received from the biometric skin-contact sensor 120, and identifier data stored in the data store 131, the processor 132 may determine which region of an operator is in contact with the device. The processor 132 may identify multiple different regions of an operator which are in contact with a region of the biometric skin-contact sensor 120. For example, a first region of an operator's hand may be in contact with the device and a second region may be in contact with the device. The controller 130 may identify which the first region of the operator's hand is, and which the second region is, based on biometric readings such as skin contours.

The scroll sensor 125 is shown as a region in the top surface of the pointing device 110. However, it is to be appreciated that any suitable means may be used to provide the scrolling functionality. For example, a scrolling wheel may be used, or scrolling may be determined based on interaction between the operator's fingers and the operation interface of the device.

Scrolling may be determined based on measurements obtained using the touch sensitive surface. Scrolling may be determined using measurements from the biometric skin-contact sensor 120, e.g. to identify scrolling based on which region of an operator's anatomy is moving on the pointing device 110, e.g. using two moving fingers as an indication of scrolling. It is to be appreciated in the context of this disclosure that scrolling may be biometric identifier data independent and that a scrolling function may be performed based on a selected number of fingers interacting with the device 110, e.g. two, and those fingers performing a selected action, e.g. moving along the device 110. The controller 130 may be configured to receive scroll sensor data, and to determine therefrom if the operator is intending to perform a scrolling function on the GUI 200.

The movement sensor 140 may be provided in a base of the pointing device 110. In the context of this disclosure, the skilled person would be aware of suitable components for performing the requisite functionality of the movement sensor 140. For example, an infrared sensor may be used to track movement relative to a ground surface, or accelerometers may be used. Measurements from the movement sensor 140 may be transmitted to the controller 130 which can determine therefrom whether the device has moved and relay this information so that a corresponding movement of the pointer 210 occurs on the GUI 200.

The device may be arranged to operate in a power-saving mode. The controller 130 may be operable to control the device to operate in a higher-energy mode in response to an indication that movement and/or scrolling of the device has occurred. The controller 130 may be operable to control the device to operate in a higher-energy mode in response to an indication of an increased pressure on the touch sensitive surface.

A method of operation of the device will now be described with reference to FIG. 4.

Figure 4:
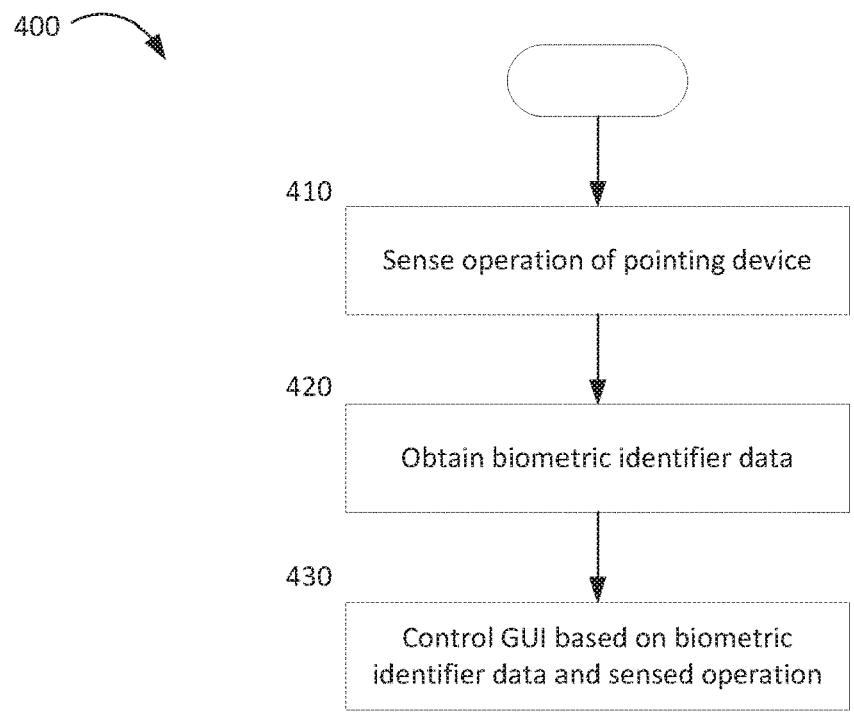
FIG. 4 is a flow chart for an example method of use of a pointing device.

FIG. 4 shows a method 400 of controlling a graphical user interface. The method is suitable for use with a pointing device of the type described herein.

At step 410, operation of the pointing device 110 is sensed. The pointing device 110 is arranged to sense operation (e.g. to respond to movement of the device and/or an indication that the operator is touching the device) for use in controlling a pointer 210 on the GUI 200. Operation of the pointing device 110 may be sensed in a number of different circumstances. For example, when the device, or the computer the device controls, is inactive, sensing operation of the pointing device 110 may be used to determine that an operator intends to use the device/computer and so the device 110 should no longer be in a low power mode, such as being idle or inactive. As another example, during use of the device/computer, operation of the pointing device 110 may be used to determine that an operator is engaged with the device, and so biometric skin-contact sensing performed by the device may be used (e.g. its use may be successful as there will be skin contact between the device and the sensor).

Operation of the pointing device 110 may be measured using a sensor of the pointing device 110. For example, this could include an accelerometer reading acceleration above a threshold level, or an optical mouse type sensor (e.g. LED/infrared) determining there is a speed/displacement above a threshold level, or a pressure sensor determining that there is an applied pressure on the device which is above a threshold level, or a capacitance measure indicating that the operator is touching the device 110. In response to sensing operation of the pointing device 110, e.g. sensing an indication of operation above a threshold level, the method 400 proceeds to step 420.

At step 420, biometric identifier data is obtained. The pointing device 110 includes a biometric skin-contact sensor 120 configured to obtain biometric identifier data. The device may obtain biometric identifier data based on skin contact between the operator and the biometric skin-contact sensor 120 of the device. The regions of the operator in contact with the device may be determined, such as the fingertips when engaging with a mouse. Step 420 includes obtaining biometric identifier data which is suitable to enable the identification of the operator of the device, or which is suitable to determine that the operator of the device is not known (e.g. does not correspond to any stored data biometric identifier data). The biometric identifier data is obtained by sensing contact of surface contours of the operator's skin. For a typical computer mouse, the surface contours of the operator's skin in contact with the mouse may include fingertips of the index and middle finger, as well as regions towards the base of these fingers and/or the palm of the operator's hand. The biometric identifier data may be obtained in response to sensing operation of the pointing device 110, e.g. the biometric skin-contact sensor 120 may be activated in response to this. Alternatively, the biometric skin-contact sensor 120 may already be activated and this step may comprise obtaining biometric identifier data without activating the sensor.

Based on the biometric identifier data obtained in step 420, the method 400 may include a number of different output options.

At step 430, operation of the device/computer is controlled based the biometric identifier data obtained by the device. The operation of the device/computer may also be controlled based on any sensed operation. The biometric identifier data may be used to determine whether or not the operator of the device is authorized to control the GUI 200. This may be for security reasons. The obtained biometric identifier data may be compared against stored biometric identifier data to determine whether or not the obtained data corresponds to any known data. For example, an operator may be able to login to their personal account on a computer based on holding the pointing device 110, as it could be determined which operator is engaged with the device and what their relevant login details are (e.g. account settings etc.). Prohibited access may also be established so that only certain operators may control the computer and operate the GUI 200 (or a subset of the available operations of the computer), and this could be determined based on the obtained biometric identifier data.

Control of the GUI 200 based on the biometric identifier data may alternatively and/or additionally include determining an appropriate control of the pointer 210 in the GUI 200 based on the operator's interaction with the pointing device 110. The pointer 210/GUI 200 may be controlled based on the operation of the device. As biometric identifier data may be obtained through interaction of the operator with the device, this obtained data may be used when determining how to control the GUI 200. For example, based on the obtained biometric identifier data, it may be determined which region of an operator is interacting with the device. The region of the operator interacting with the device, in combination with the sensed operation of the device, may control the action taken with the pointer 210 of the GUI 200. It is to be appreciated in the context of this disclosure that a method of sensing operation and obtaining biometric identifier data may find multiple different applications, and examples of control of the GUI 200 described herein are not to be considered limiting as multiple options for control may exist.

Further features of the devices and methods described herein will be discussed with reference to FIGS. 5a, 5b and 6.

Figure 5A:
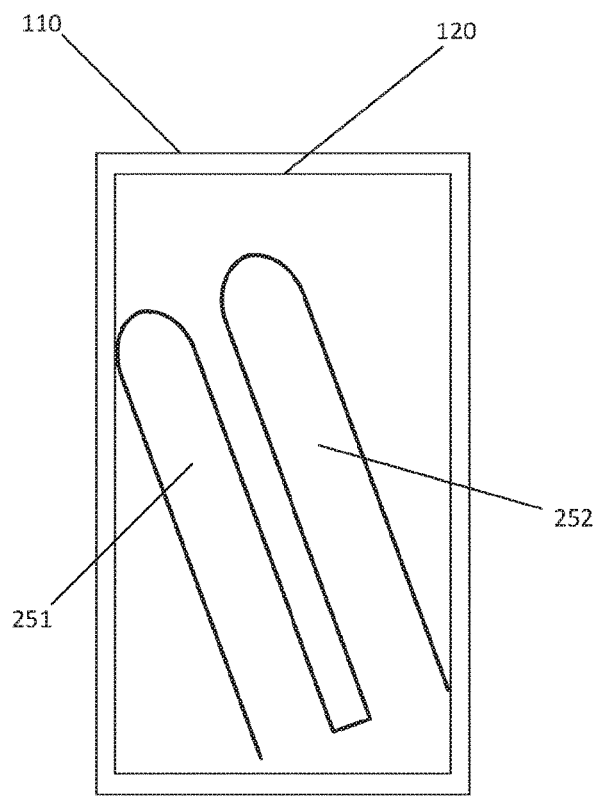
FIG. 5a is a schematic diagram of a pointing device viewed in plan when being operated by two fingers of an operator.

FIG. 5a shows the pointing device 110, as in FIG. 3, with the biometric skin-contact sensor 120. Also shown is a portion of an operator's hand when operating the device. As shown, the operator's hand includes a first anatomical region and a second anatomical region in contact with the device. In the example shown, the first anatomical region is the operator's index finger 251, and the second anatomical region is the operator's middle finger 252. It is to be appreciated in the context of this disclosure that any suitable anatomical location may be used. The operator is engaging with the device so that pressure is applied between regions of their hand and the pointing device 110 itself.

Figure 5B:
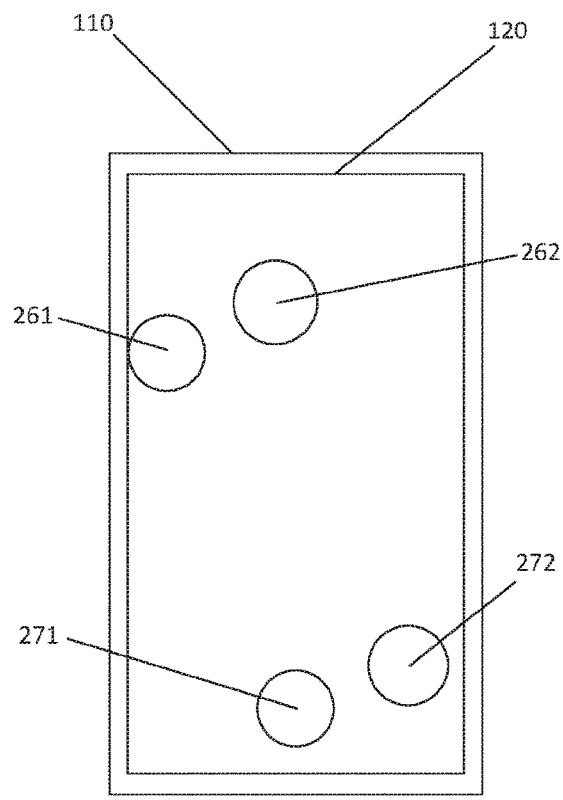
FIG. 5b is a schematic diagram of the pointing device of FIG. 5a without the operator's fingers illustrated.

FIG. 5b shows the pointing device 110 of FIG. 5a with the operator's hand not shown. Instead, four pressure points are shown which correspond to regions of the device of FIG. 5a which the operator is engaged with (e.g. regions where the operator is applying a pressure above a threshold level). As shown, both the index finger 251 and the middle finger 252 have 2 pressure points associated therewith. The index finger 251 has two associated pressure points: (i) the first index finger region 261 which corresponds to a region where the fingertip is interacting with the device, and (ii) the second index finger region 271 which corresponds to a region nearer to the base of the operator's index finger 251/proximal to the operator's palm. The middle finger 252 has two associated pressure points: (i) the first middle finger region 262 which corresponds to a region where the fingertip is interacting with the device, and (ii) the second middle finger region 272 which corresponds to a region nearer to the base of the operator's middle finger 252/proximal to the operator's palm. The regions shown and their location on the device are exemplary, and are used to illustrate the functionality of the device.

Biometric identifier data may be stored which corresponds to predefined anatomical regions of a known operator. For example, this may be stored in a format which associates, for each of a plurality of operators, that operator with at least one item of data corresponding to biometric identifier data for the operator in a predefined anatomical region. Each operator may be associated with a plurality of items of data, e.g. corresponding to multiple fingertips and/or other regions of that operator's hands/fingers. It is to be appreciated that different regions of an operator's skin will have different contours, and so based on a stored indication of the relevant skin contours, it is possible to determine which region of an operator's skin (e.g. which region of their hand) is in contact with the device. It is to be appreciated that stored biometric identifier data may be stored in either the device itself (such as in the data store 131), or in a computer to which the device is connected.

The biometric skin-contact sensor 120 may cover a substantial portion of the operation interface of the device. There may be a number of different contact regions on the device where there is some interaction between the operator and the device, e.g. where some pressure is being applied. The skin-contact sensor 120 may enable identification of the relevant region of the operator's anatomy based on stored biometric identifier data corresponding to that operator. The operator may interact with the biometric skin-contact sensor 120 at any region on the sensor, and the device still operable to determine which anatomical region is interacting with the device. For example, at any location on the sensor, it may be possible to identify that it is an operator's index finger 251 which is applying pressure.

A conventional computer mouse has a left button and a right button arranged at the front end of the mouse. During normal operation, these typically correspond to regions where the operator places their index finger 251 (left button) and middle finger 252 (right button). Operation of the left or right buttons is associated with different functions on the computer. Therefore, with a conventional mouse, to operate one of these functions, an operator must click the mouse in the right region. For example, using the index finger 251 on the right button will still cause a right button functionality to be operated, irrespective of the fact that it was an operator's index finger 251 which pressed the button. In some cases, it is not clear where one button ends and the next one begins. Also, there may be large regions of a conventional mouse in which applying pressure (e.g. clicking) does not do anything.

Embodiments of the present disclosure may enable the pointing device 110 to operate in a different way. For example, as opposed to controlling operation of the computer based on clicking the left button or clicking the right button, an operator may experience the same functionality based on clicking with the index finger 251 or the middle finger 252. The location at which an operator's finger(s) applies pressure may not be relevant for the functionality. For example, in FIG. 5*b* the first middle finger region 262 is located on the left hand side, in a region where a conventional mouse would have the left button. However, using the device and biometric skin sensor, it is possible to identify that it is an operator's middle finger, and so middle finger functionality (e.g. right button functionality) should be actuated. Of course, left and right microswitch clicking buttons may still be used, as in FIGS. 1*a* to *f*.

By having at least two stored predefined locations for the operator's skin, the device may have assigned functionality associated with actuation by each of these predefined locations. These two (or more) different locations may have different associated control functions, and the relevant corresponding control action may be selected based on a predefined location of the operator's anatomy identified by the skin-contact sensor 120 during use. It is to be appreciated in the context of this disclosure that control of the device may also be based on the contact regions between the operator's skin and the sensor. For example, certain selected regions of the device may be associated with different functionality.

During use, an operator may simultaneously engage with the device in multiple different locations. For example, as shown in FIG. 5*b*, there may be two (or more) contact regions associated with each finger operating the device. Pressure applied at these contact regions could indicate that a click of the mouse is intended, but more than one pressure point may be associated with an intended click. Likewise, an operator may accidentally engage with the device, e.g. with a portion of their anatomy with which they did not intend to engage with the device.

The biometric identifier data for an operator may comprise data for predetermined regions of their anatomy, such as their finger. The biometric identifier data for different regions may be associated with different permissions and/or expectations. For example, regions of an operator's hand could be identified which are associated with either intentional clicking or unintentional clicking, or a percentage likelihood of whether or not interaction with that region was intentional. Based on the identified region of an operator's anatomy associated with a sensed interaction with the device, it may be determined whether or not that interaction was intentional, e.g. whether or not to disregard it. Operation of the device may be based on a determination of whether or not interaction with the device was intentional. These intentional/unintentional interactions could be learnt based on machine learning in combination with testing with operators of the device.

In a similar manner, where multiple pressure points were measured simultaneously (e.g. as shown in FIG. 5*b*), it may be determined which of these were intentional. For example, an operator clicking with their fingertip may also cause them to apply pressure with the base of their finger. Through use of the biometric skin-contact sensor 120, it may be determined that this has happened, e.g. there may be stored biometric identifier data associated with that operator's fingertip and the base of their finger (or any other likely region to come into contact with the mouse).

By monitoring which region of an operator's anatomy is interacting with the device, different functionalities for the GUI 200 (e.g. the pointer 210) may be implemented. Use of stored biometric identifier data for an operator and obtained biometric data from the skin-contact sensor 120 may enable the determination of which region of the operator's anatomy is in contact with the skin-contact sensor 120. It may also enable the determination of how much of that region of the anatomy is contact with the sensor and/or an indication of how much pressure they are applying. For example, an operator may poke the tip of their finger at the sensor or they may place the entirety of their fingertip (e.g. the top third of their finger) on the sensor. These two different interactions may be associated with different functionalities. The device may be operable to determine a surface area of the region of the anatomy engaged with the device and/or a pressure being applied. The region in contact with the sensor may be determined based at least in part on stored biometric data associated with regions of the operator's anatomy and/or on a distribution of pressure being applied to the device by the operator. For example, a greater pressure being applied may indicate a greater chance that it is intentional.

The biometric skin-contact sensor 120 may enable additional to functionality for the pointer/the computer such as scrolling and/or zooming to be implemented without the need for a separate e.g. scrolling/zooming component. The pointer/computer may be controlled based also on the biometric identifier data for the region of the operator's anatomy interacting with the device.

Scrolling may be associated with a particular type of engagement between the operator and the device. This may involve movement of a selected finger of the operator, or a selected set of fingers. For example, movement of the operator's ring finger, or any two fingers, or a specific combination of two fingers along the sensor may indicate scrolling. Scrolling may also be indicated based on moving a selected portion of an operator's finger across the sensor, or moving that finger in a selected way, as this could also be determined based on sensed biometric data of the operator's fingers.

The skin-contact sensor 120 may be operable to detect a contact region with which an operator of the device is engaged, for example the region of the sensor that the operator's is pressing on. The surface area of the operator's skin in contact with the sensor may be determined. For example, this may be based on the surface area for which there is an applied pressure which is above a selected threshold pressure. Operation of the GUI 200 may be based on this surface area. For example, movement along the sensor with a contact surface area above a selected threshold may indicate that a scrolling function is desired. Other functions may also be provided/selected based on the surface area of the contact region between the operator and the device.

The operation interface/biometric skin-contact sensor 120 may be provided by a touch sensitive surface, or at least a portion thereof may be provided by the touch sensitive surface. This surface may cover a substantial portion of the device. Interaction between the operator's skin and the device presents a contact location on the surface of the touch sensitive surface. A contact location of the surface may be identified and the operation of the touch sensitive surface controlled based on this contact location. Operation of the biometric skin-contact sensor 120 may be confined to regions in which a contact location is detected. For example, where a detected contact pressure on the surface is above a threshold pressure, biometric skin-contact sensing may be activated in that region, and in regions where the contact pressure is below the threshold pressure, biometric skin-contact sensing may not be activated.

A method of operation of an example pointing device described herein will now be described with reference to FIG. 6.

Figure 6:
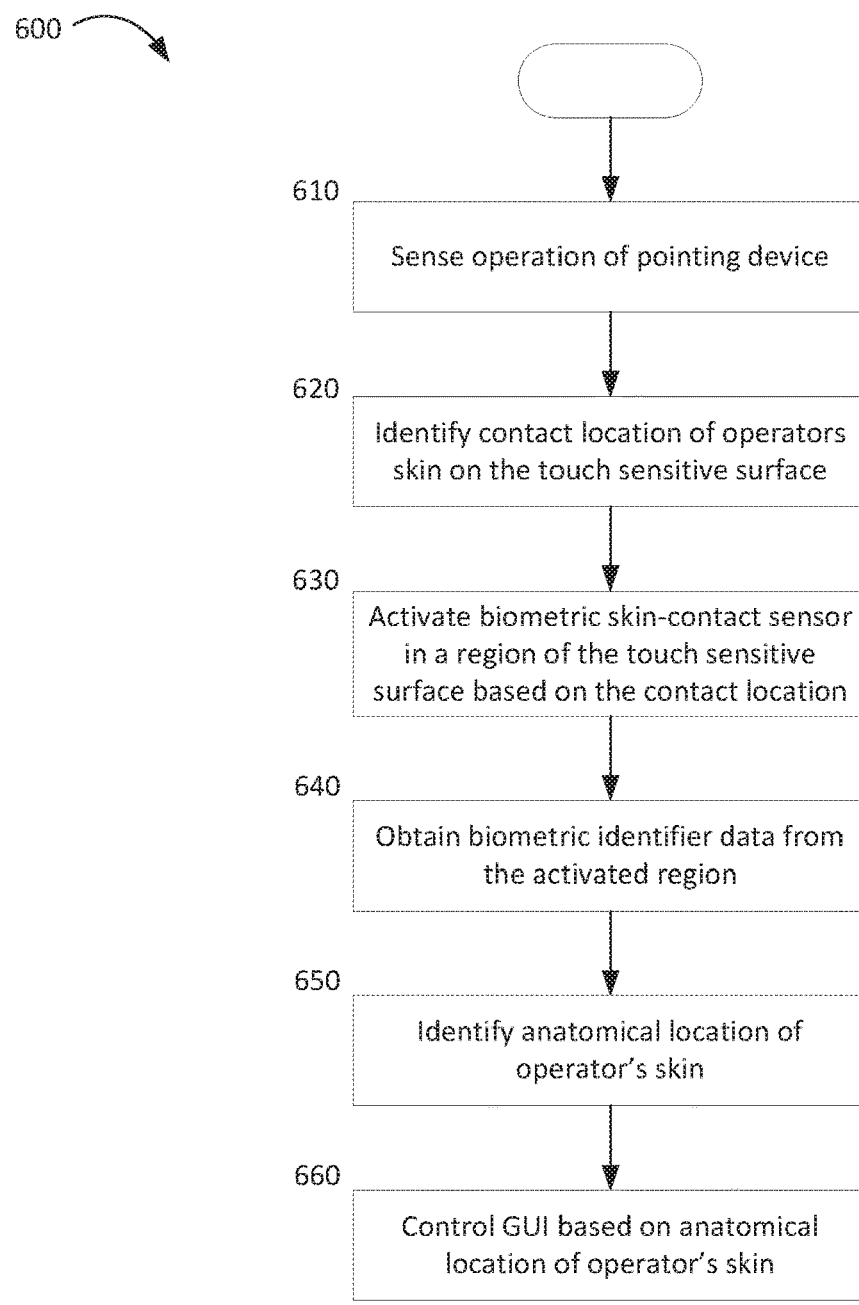
FIG. 6 is a flow chart for an example method of use of a pointing device.

FIG. 6 shows a flowchart for a method 600 of controlling a graphical user interface of a computer. The method 600 may comprise using a pointing device of the type disclosed herein.

At step 610 operation of the pointing device 110 is sensed. This step 610 may correspond to step 410 as described earlier with reference to FIG. 4, and so will not be discussed in detail again. The method 600 includes the operator engaging with the device in some way in which operation of that device is sensed. As part of this operation, the operator's skin will at some point come into contact with the biometric skin-contact sensor 120 of the device.

At step 620, at least one contact location between the operator's skin and a touch sensitive surface of the device is identified. Operation of the GUI 200 may be controlled based on the contact location, such as determining that the current location is associated with a particular functionality on the GUI 200, and performing that function. Certain functions may be prohibited without the relevant security access, and so whilst some functions may be performed based on the contact location, some may not be allowed until it has been determined using the biometric skin-contact sensor 120 that the operator is allowed to perform such functions. In any case, it is to be appreciated that sensing operation and/or identifying the contact location may be based on normal operation of the device, e.g. an operator holding the device when they intend to start using the device.

At step 630, the biometric skin-contact sensor 120 is used to obtain biometric identifier data.

This comprises activating the biometric skin-contact sensor 120 in response to operation of the device being sensed and/or a contact location being identified. Which region(s) of the sensor to activate is determined based on the determined contact region on the pointing device 110. The sensor may be activated in a region of the sensor which includes the contact region, such as activating at least one predefined region based on which of these predefined regions the contact region is in and/or determining a region based on the contact region, e.g. a region surrounding the contact region. The biometric skin-contact sensor 120 is activated so that identifier data may be obtained for all contact points between the operator's skin and the sensor. The biometric sensor may not be activated in other regions in which it is determined that there is no contact between the sensor and the operator.

At step 640, biometric identifier data is obtained using the biometric skin-contact sensor 120 in the regions in which it has been activated. Biometric identifier data is obtained for at least one region of the operator's skin in contact with the sensor. It may be obtained for more (e.g. all) regions of the operator's skin which are in contact with the sensor.

At step 650, the anatomical location of the operator's skin is identified. This may comprise identifying each region of the operator's skin which is in contact with the sensor. It may comprise identifying each identifiable region of the operator's skin which is in contact with the sensor. Identifying the anatomical location may be based on stored biometric identifier data.

The obtained data is compared to the stored data and if it is determined that the obtained data corresponds to an item of stored data (e.g. there is a similarity match above a threshold level), then it may be determined that the obtained data corresponds to that item of stored data. In which case, the operator, and their anatomical location in contact with the sensor, may be identified. This process may be repeated for each contact region between the operator's skin and the sensor. A plurality of predefined locations for one operator may then be identified as those locations of the operator's skin which are in contact with the pointing device 110. At least one anatomical location of the operator's skin may be identified, based on which operation of the GUI 200 may be controlled.

At step 660, the GUI 200 (e.g. the pointer 210) is controlled based on at least one of the anatomical locations of the operator's skin in contact with the sensor. This control may occur in a number of forms. For example, the functionality provided by interaction with the pointing device 110 may depend based on which anatomical location is used for the interaction with the pointing device 110. The desired functionality may therefore be established and/or performed based on a determination of which region(s) of the operator's anatomy is in contact with the sensor. As another example, whether or not an operator is allowed to perform a certain function may be dependent on their security credentials, which are identifiable based on stored biometric identity data. In the event that obtained biometric identifier data for the operator corresponds to stored data associated with an operator having the required security credentials, the computer may be controlled to enable the desired function to be performed. In the event that the obtained biometric identifier data for the operator does not correspond to stored data associated with an operator having the required security credentials, the operator may not be able to perform the desired function. As another example, an operator may be automatically logged into their account in response to it being determined that it is their anatomical regions in contact with the sensor.

Operation of the computer/GUI 200 may therefore be controlled based on the identified anatomical location of the operator which is in contact with the sensor.

Examples of pixels and pixel arrays to form a sensor array of a biometric skin-contact sensor of the type disclosed herein will now be discussed with reference to FIGS. 7 to 10.

Figure 7:
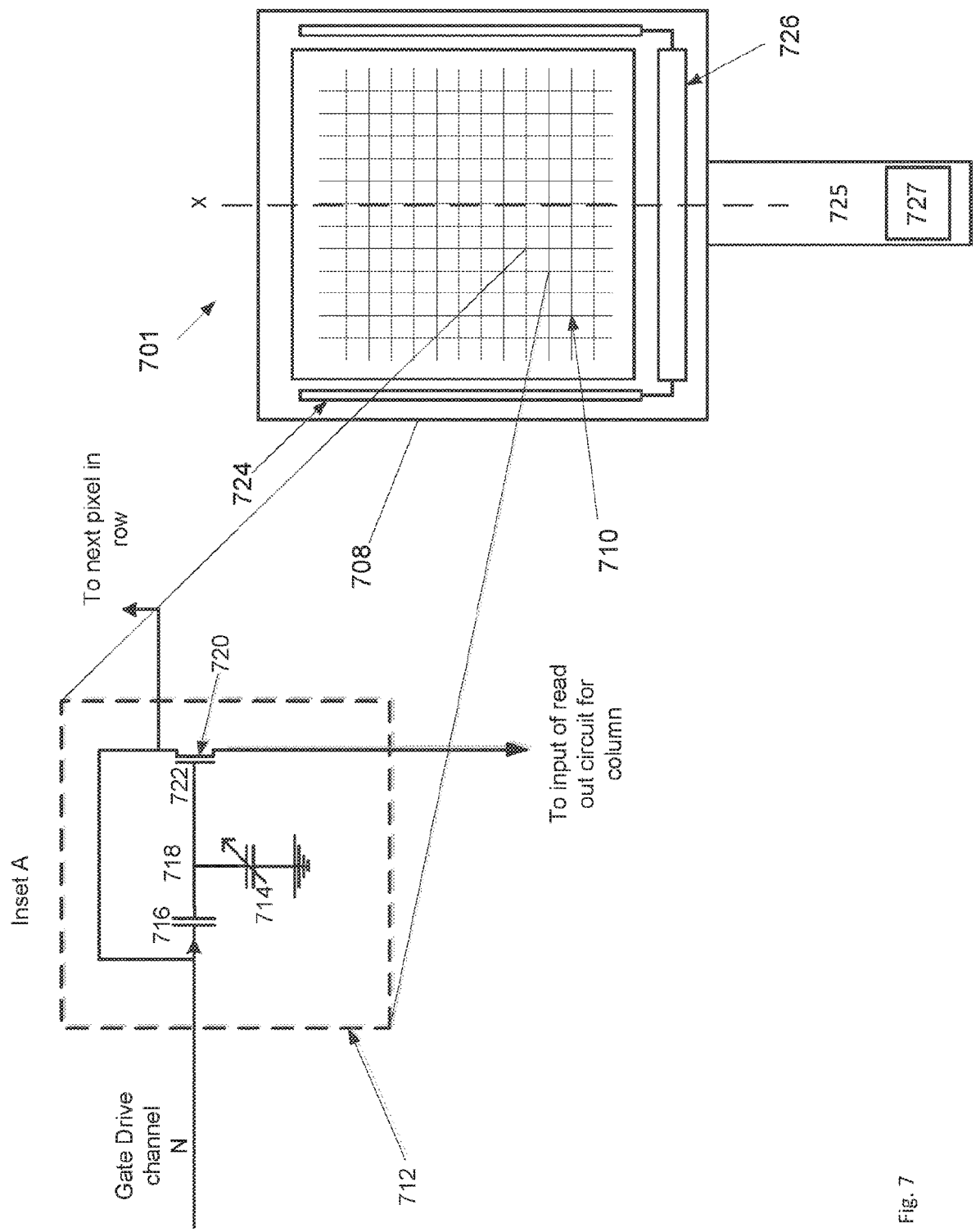
FIG. 7 is a schematic diagram of a plan view of a sensor apparatus comprising a sensor array, and Inset A of FIG. 7 shows a circuit diagram for a pixel of the sensor array.
Figure 8:
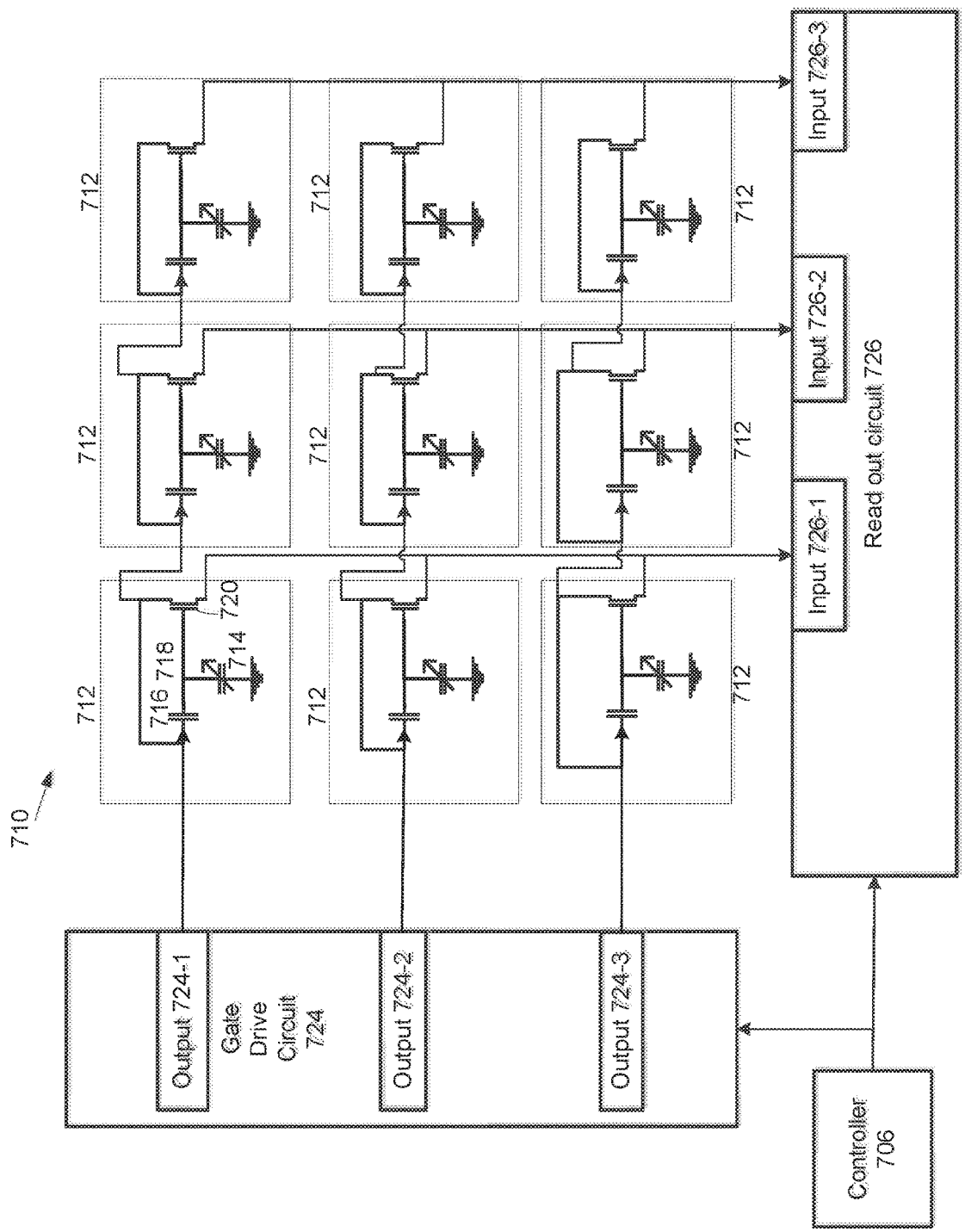
FIG. 8 shows a circuit diagram of a sensor array for a sensor apparatus such as that illustrated in FIG. 7.

FIG. 7 shows a sensor apparatus 701 in which a sensor array 710 may be incorporated. FIG. 8 illustrates a circuit diagram of one such sensor array 710. The description which follows shall refer to FIG. 7 and FIG. 8 together. It can be seen from an inspection of FIG. 7 and FIG. 8 that inset A of FIG. 7 shows a detailed view of one pixel of this array 710.

The sensor array 710 comprises a plurality of touch sensitive pixels 712. Typically, other than in respect of its position in the array, each pixel 712 is identical to the others in the array 710. As illustrated, each pixel 712 comprises a capacitive sensing electrode 714 for accumulating a charge in response to proximity of the surface of a conductive object to be sensed. For example, this may include the operator contacting the sensor apparatus 701. A reference capacitor 716 is connected between the capacitive sensing electrode 714 and a connection to a gate drive channel 724-1 of a gate drive circuit 724. Thus, a first plate of the reference capacitor 716 is connected to the gate drive channel 724-1, and a second plate of the reference capacitor 716 is connected to the capacitive sensing electrode 714.

Each pixel 712 may also comprise a sense VCI (voltage controlled impedance) 720 having a conduction path, and a control terminal (722; inset A, FIG. 7) for controlling the impedance of the conduction path. The conduction path of the sense VCI 720 may connect the gate drive channel 724-1 to an output of the pixel 712. The control terminal 722 of the VCI is connected to the capacitive sensing electrode 714 and to the second plate of the reference capacitor 716. Thus, in response to a control voltage applied by the gate drive channel 724-1, the reference capacitor 716 and the capacitive sensing electrode 714 act as a capacitive potential divider.

The capacitance of the capacitive sensing electrode 714 depends on the proximity, to the capacitive sensing electrode 714, of a conductive surface of an object to be sensed. Thus, when a control voltage is applied to the first plate of the reference capacitor 716, the relative division of that voltage between that sensing electrode 714 and the reference capacitor 716 provides an indication of the proximity of the surface of that conductive object to the capacitive sensing electrode 714. This division of the control voltage provides an indicator voltage at the connection 718 between the reference capacitor 716 and the capacitive sensing electrode 714. This indicator voltage can be applied to the control terminal 722 of the sense VCI 720 to provide an output from the pixel 712 which indicates proximity of the conductive object.

Pixels may be positioned sufficiently close together so as to be able to resolve contours of the skin such as those associated with epidermal ridges, for example those present in a fingerprint, palmprint or other identifying surface of the body. It will be appreciated in the context of the present disclosure that contours of the skin may comprise ridges, and valleys between those ridges. During touch sensing, the ridges may be relatively closer to a sensing electrode than the "valleys" between those ridges. Accordingly, the capacitance of a sensing electrode adjacent a ridge will be higher than that of a sensing electrode which is adjacent a valley. The description which follows explains how systems can be provided in which sensors of sufficiently high resolution to perform fingerprint and other biometric touch sensing may be provided over larger areas than has previously been possible.

As shown in FIG. 7 and FIG. 8 in addition to the sensor array 710, such a sensor may also comprise a dielectric shield 708, a gate drive circuit 724, and a read out circuit 726. A connector 725 for connection to a host device may also be included. This may be provided by a multi-channel connector having a plurality of conductive lines. This may be flexible, and may comprise a connector such as a flexi, or flexi-rigid PCB, a ribbon cable or similar. The connector 725 may carry a host interface 727, such as a plug or socket, for connecting the conductive lines in the connector to signal channels of a host device in which the sensor apparatus 701 is to be included.

The host interface 727 is connected by the connector 725 to the read-out circuit 726. A controller (706; FIG. 8) may be connected to the gate drive circuit 724 for operating the sensor array, and to the read-out circuit 726 for obtaining signals indicative of the self-capacitance of pixels of the sensor array 710.

The dielectric shield 708 is generally in the form of a sheet of an insulating material which may be transparent and flexible such as a polymer or glass. The dielectric shield 708 may be flexible, and may be curved. An 'active area' of this shield overlies the sensor array 710. In some examples, the VCIs and other pixel components are carried on a separate substrate, and the shield 708 overlies these components on their substrate. In other embodiments the shield 708 provides the substrate for these components.

The sensor array 710 may take any one of the variety of forms discussed herein. Different pixel designs may be used, typically however the pixels 712 comprise at least a capacitive sensing electrode 714, a reference capacitor 716, and at least a sense VCI 720.

The array illustrated in FIG. 8 comprises a plurality of rows of pixels such as those illustrated in FIG. 7. Also shown in FIG. 8 is the gate drive circuit 724, the read out circuit 726, and a controller 706. The controller 706 is configured to provide a clock signal, e.g. a periodic trigger, to the gate drive circuit 726, and to the read-out circuit 726.

The gate drive circuit 724 comprises a plurality of gate drive channels 724-1, 724-2, 724-3, which it is operable to control separately, e.g. independently. Each such gate drive channel 724-1, 724-2, 724-3 comprises a voltage source arranged to provide a control voltage output. And each channel 724-1 is connected to a corresponding row of pixels 712 of the sensor array 710. In the arrangement shown in FIG. 8 each gate drive channel 724-1, 724-2, 724-3 is connected to the first plate of the reference capacitor 716 in each pixel 712 of its row of the sensor array 710. During each clock cycle, the gate drive circuit 724 is configured to activate one of the gate drive channels 724-1, 724-2, 724-3 by applying a gate drive pulse to those pixels. Thus, over a series of cycles the channels (and hence the rows) are activated in sequence, and move from one step in this sequence to the next in response to the clock cycle from the controller 706.

The read-out circuit 726 comprises a plurality of input channels 726-1, 726-2, 726-3. Each input channel 726-1, 726-2, 726-3 is connected to a corresponding column of pixels 712 in the sensor array 710. To provide these connections, the conduction path of the sense VCI 720 in each pixel 712 is connected to the input channel 726-1 for the column.

Each input channel 726-1, 726-2, 726-3 of the read out circuit 726 may comprise an analogue front end (AFE) and an analogue-to-digital converter (ADC) for obtaining a digital signal from the column connected to that input channel 726-1. For example it may integrate the current applied to the input channel during the gate pulse to provide a measure of the current passed through the sense VCI 720 of the active pixel 712 in that column. The read out circuit 726 may convert this signal to digital data using the ADC. Furthermore, the analogue front end performs impedance matching, signal filtering and other signal conditioning and may also provide a virtual reference.

In the sensor array 710 shown in FIG. 8, the conduction channel of the sense VCI 720 in each pixel connects the input channel of the read out circuit for that column to the gate drive channel for the pixel's row. In FIG. 8, the gate drive channel for the row thus provides a reference input. Operation of the sense VCI 720 modulates this reference input to provide the pixel output. This output signal from a pixel indicates the charge stored on the capacitive sensing electrode 714 in response to that reference input relative to that stored on the reference capacitor.

FIG. 7 includes a grid as a very schematic illustration of the rows and columns of pixels 712 which make up the array. Typically this will be a rectilinear grid, and typically the rows and columns will be evenly spaced. For example the pixels may be square. It will of course be appreciated that the grid shown in FIG. 7 is not to scale. Typically the sensor array has a pixel spacing of at least 200 dots per inch, dpi (78 dots per cm). The pixel spacing may be at least 300 dpi (118 dots per cm), for example at least 500 dpi (196 dots per cm).

Operation of the sensor array 710 of FIG. 8 will now be described.

On each cycle of operation, the gate drive circuit 724 and the read out circuit 726 each receive a clock signal from the controller 706.

In response to this clock signal, the gate drive circuit operates one of the gate drive channels to apply a control voltage to one of the rows of the array. In each pixel in the row, the control voltage from the gate drive channel is applied to the series connection of the reference capacitor 716 and the capacitive sensing electrode 714. The voltage at the connection 718 between the two provides an indicator voltage indicating the proximity of a conductive surface of an object to be sensed to the capacitive sensing electrode 714. This indicator voltage may be applied to the control terminal of the sense VCI 720 to control the impedance of the conduction path of the sense VCI 720. A current is thus provided through the conduction path of the sense VCI 720 from the gate drive to the input channel for the pixel's column. This current is determined by the gate drive voltage, and by the impedance of the conduction channel.

In response to the same clock signal, the read-out circuit 726 senses the pixel output signal at each input channel. This may be done by integrating the current received at each input of the read-out circuit 726 over the time period of the gate pulse. The signal at each input channel, such as a voltage obtained by integrating the current from the corresponding column of the array, may be digitised (e.g. using an ADC). Thus, for each gate pulse, the read-out circuit 726 obtains a set of digital signals, each signal corresponding to a column of the active row during that gate pulse. So the set of signals together represent the active row as a whole, and the output from each pixel being indicative of the charge stored on and/or the self-capacitance of the capacitive sensing electrode 714 in that pixel.

Following this same process, each of the gate-drive channels is activated in sequence. This drives the sense VCI 720 of each pixel connected to that channel into a conducting state for a selected time (typically the duration of one gate pulse). By activating the rows of the array in sequence the read out circuit, can scan the sensor array row-wise. Other pixel designs, other scan sequences, and other types of sensor array, may be used.

Wth reference to FIGS. 9 and 10, a further sensor apparatus will be described which may form a biometric skin-contact sensor of the type disclosed herein.

Figure 9:
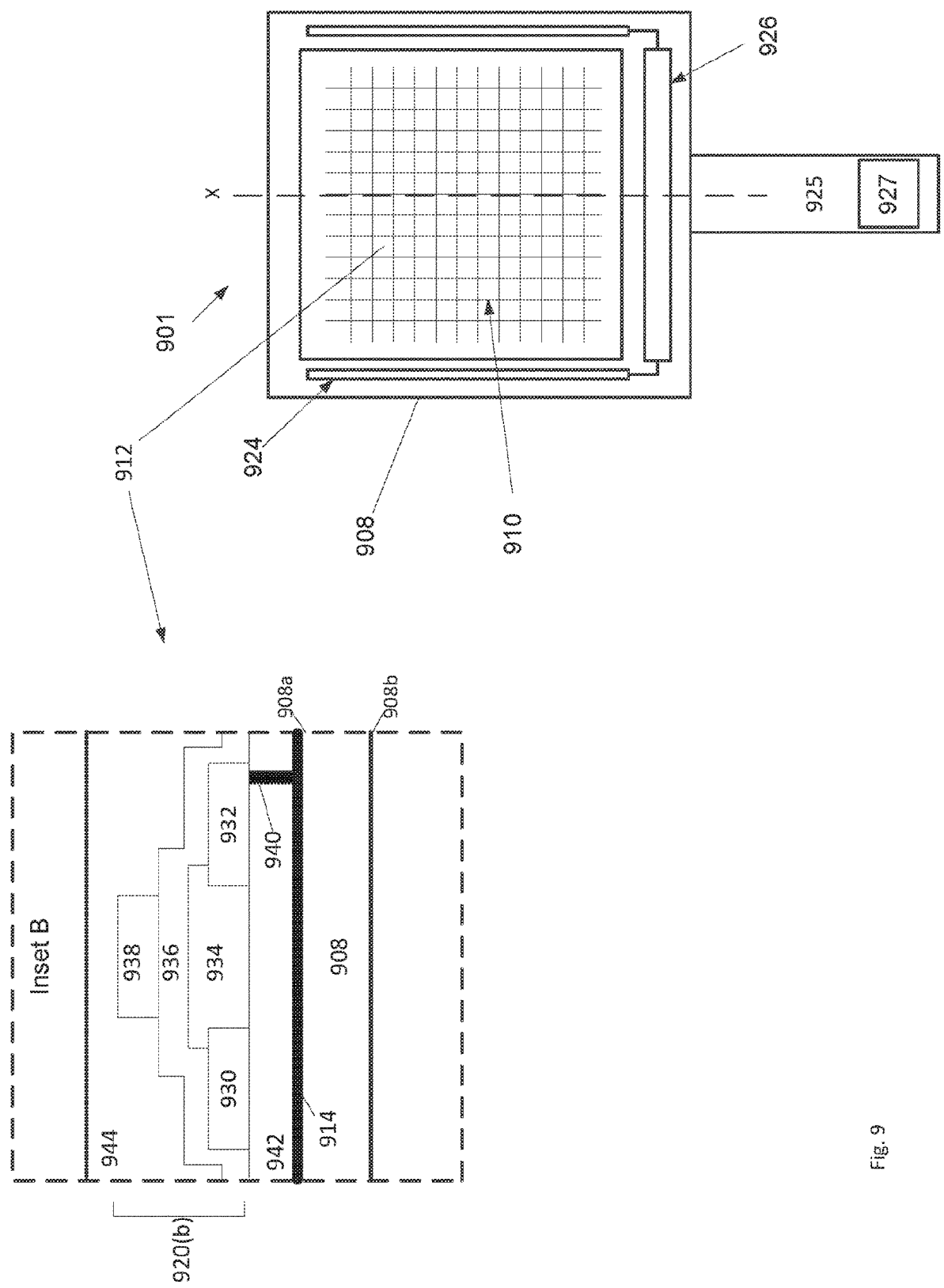
FIG. 9 is a schematic diagram of a plan view of a pixel apparatus comprising a pixel array, and Inset B of FIG. 9 shows an exemplary pixel structure of the pixel array.

FIG. 9 illustrates a sensor apparatus 901 having a sensor array 910 in which a pixel structure 912 may be incorporated. An exemplary cross-sectional structure of the pixel 912 is shown in a detailed view in Inset B. FIG. 10 shows a similar sensor apparatus 901 comprising an alternative pixel structure 912', which is shown in Inset C. FIGS. 9 and 10 will be described together below.

The pixel array 910 comprises a plurality of touch sensitive pixels 912, 912'. The pixel array 910 comprises rows and columns of adjacent individual pixels 912, 912'. Individual pixels 912, 912' are capable of being individually addressed. Typically, other than in respect of its position in the array, each pixel 912, 912' is identical to the others in the array 910. As illustrated, each pixel 912, 912' comprises a capacitive sensing electrode 914 for accumulating a charge in response to proximity of the surface of a conductive object to be sensed and a thin film transistor (TFT) 920, the structure of which may be as illustrated by TFT 920(b) in Inset B (top gate) of FIG. 9 or TFT 920(c) in Inset C (bottom gate) of FIG. 10.

A dielectric shield 908 provides the substrate on which layers of the pixel may be disposed. For example, a capacitive sensing electrode 914 and a TFT 920 may be "stacked" in layers on top of the dielectric shield 908, wherein the dielectric shield 908 is the substrate/carrier.

The structure of each individual pixel 912, 912' stacked on the dielectric shield 908 comprises a capacitive sensing electrode 914 coupled to a TFT 920. The capacitive sensing electrode 914 is disposed between the dielectric shield 908 and TFT 920, and is connected to the TFT 920 by a conductive via 940.

The capacitive sensing electrode 914 may be spaced away from the TFT 920 by an insulating layer 942, for example a passivation layer or dielectric layer. The insulating layer 942 may comprise an insulator material such as an inorganic Silicon Nitride, or an organic dielectric. The conductive via 940 is disposed through the passivation layer 942 to connect the capacitive sensing electrode 914 to the TFT 920 and/or the gate insulator layer 936 (depending on the TFT 920 configuration)

A top gate TFT, shown by 920(b) of FIG. 9 comprises: a first metal layer comprising: a source region 930, and a drain region 932; an active layer 934 disposed between the regions of the first metal layer; an insulating layer 936, or gate insulator layer, disposed on the active layer 934 and first metal layer; and a second metal layer 938, for example a gate region 938, disposed on and separated from the source 930, drain 932 and active 934 regions by the insulating layer. The first metal layer comprises a source region 930 and a drain region 932, which are separated from one another. The first metal layer is adjacent the active layer 934, for example a channel region 934, which comprises a semiconductor. The active/channel layer is adjacent the gate insulator layer 936, which comprises a dielectric. A second metal layer, adjacent the insulating layer 936 comprises a gate region 938. The structure of the TFT 20 is such that the first and second metal layers are separated by the gate insulator layer 936.

Figure 10:
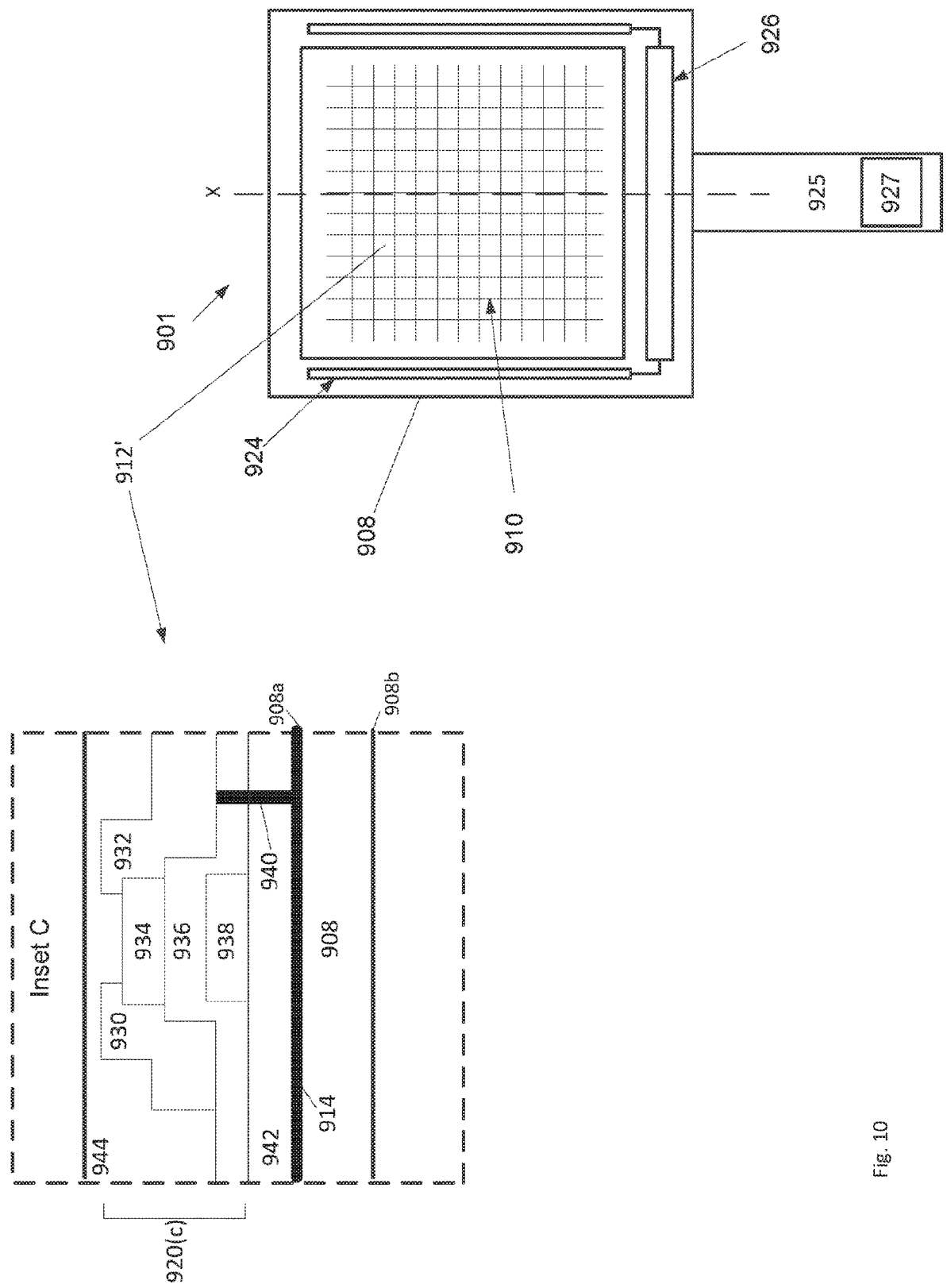
FIG. 10 is a schematic diagram of a plan view of a pixel apparatus comprising a pixel array, and Inset C of FIG. 10 shows an alternative exemplary pixel structure of the pixel array.

A TFT, as shown in 920(c) in FIG. 10 shows a bottom gate TFT which can be fabricated by an alternative process order comprising: a first metal layer comprising, for example a gate region 938; a gate insulator layer 936 disposed over the gate region 938 such that the gate region is covered by the insulating layer; an active layer 934 disposed over the insulating layer 936; and a second metal layer comprising, for example, a source region 930, and a drain region 932. In both top gate and bottom gate configurations, the source and drain regions comprise metallic islands and are separated such that they are conductively (e.g. electrically/ohmically) isolated in an "off" state. In an "on" state, the active region, comprising a semiconductor, provides a conductive path between the source and drain regions. The insulating layer 936 shields the first metalized layer from the second metalized layer in both top gate and bottom gate configurations.

The TFT 920 may be encapsulated by an additional passivation layer 944, for example a protective layer, once it has been deposited in the stack on the dielectric shield 908 acting as the substrate.

The source region 930 and drain region 932 are connected by the active layer/channel region 934 comprising a semiconductor. The layer of metal which provides the source, drain and active/channel regions of the TFT 920 can be referred to as a source-drain layer of the pixel. The source region 930 comprises a conductor and is connected to an input of the pixel. The drain region 932 also comprises a conductive material, and is typically made from the same material as the source region 930 for ease of manufacture. For example, the drain region 932 may be manufactured during the same process step as the source region 930. The drain region 932 is connected to an output of the pixel. The channel region 934, or active region, comprises a thin film semi-conductor which provides a conduction path between the source 930 and drain 932 regions when biased or in an "on" state.

The conductive via connects the capacitive sensing electrode 914 to the drain region 932 of the TFT 920.

In instances where the insulating/passivation layer 942 is in a the thinner range (e.g. 200-500 nm), the TFT 920 may be a bottom gate TFT (FIG. 10), such that the conductive via 940 passes through both insulating/passivation layer 942 and gate insulator layer 936 (of TFT 920). In instances where the insulating layer 942 is thicker (1-2 pm), the TFT 920 may be a top gate TFT (FIG. 9) such that the conductive via 940 passes only through the insulator layer 942. These arrangements may provide improved performance of the capacitive sensing electrode 914, although it will be appreciated that either can be used.

The spacing distance of the capacitive sensing electrode 914 from the TFT 920 "shields" the electronic circuit (or pixel circuit) from any external interference, for example from a resulting electromagnetic field. The electrode 914 and the spacing together provide the shielding effect.

In addition to each of the pixels 912, 912' in pixel array 910, such a pixel apparatus 901 comprises a gate drive circuit 924, and a read out circuit 926. The gate drive circuit 924 and the read out circuit 926 are connected to the TFTs 920 of the pixel 912, 912' via gate lines (rows) and source/data lines (columns) of the same conductive material as the source, drain and gate regions, such that a pixel can be individually addressed.

A connector 925 for connection to a host device may also be included. The connector 925 carries a host interface 927, such as a plug or socket, for connecting the conductive lines in the connector to signal channels of a host device in which the pixel apparatus 901 is to be included.

The host interface 927 is connected by the connector 925 to the read out circuit 924. A controller is connected to the gate drive circuit 926 for operating the pixel array, and to the read out circuit 926 for obtaining signals indicative of self-capacitance of pixels of the pixel array 910.

Each pixel 912, 912' can be individually addressed by virtue of the gate drive circuit 924, which comprises a plurality of gate drive channels and is configured to activate the gate drive channels in sequence. The connector 925 is provided by a multi-channel connector having a plurality of conductive lines. This can be flexible, and may comprise a connector such as a flexi, or flexi-rigid PCB, a ribbon cable or similar.

The plurality of layers, such as the dielectric shield 908, of the pixel 912, 812' can be disposed on the substrate using a plurality of techniques apparent to the skilled person in the context of this disclosure. For example, the substrate may comprise/provide the dielectric shield 908. The capacitive sensing electrode 914 being disposed on the dielectric shield 908 may improve encapsulation and may increase sensitivity to the object to be sensed, as well as performance of the pixel. In a typical pixel apparatus, the dielectric shield 908 that provides a surface to be touched by an object to be sensed is applied as a final layer of the structure, and is not utilised as a substrate onto which the capacitive sensing electrode 914 is deposited. Encapsulation of such typical pixels can be problematic. By disposing the layers of the pixel 912 onto the dielectric shield 908, encapsulation can be improved. The method of manufacture of the pixel 912, 912' can also simplified, in particular for large-area arrays.

The TFT 920 layers of the pixel may also be deposited onto the substrate, wherein the capacitive sensing electrode 914 is disposed between the TFT 920 and the dielectric shield 908. Beneficially, the manufacturing process can be further simplified using this technique and pixel performance may be further enhanced by improving alignment, for example.

The combined elements of the sensor apparatus work to sense an interaction with the pixel array 910 at one or more pixels 912, 912'.

The pixel array 910 disposed on the dielectric shield 908 in the sensor apparatus 901 provides a sensor, for example an active area defined by the pixels 912, 912', to be touched by an object 950 to be sensed. The capacitive sensing electrode 914 is adjacent to the first surface 908a of the dielectric shield 908. A change of capacitance in the capacitive sensing electrode 914 occurs when the second surface 908b of the dielectric shield 908 is touched or an object is sensed. Depositing the capacitive sensing electrode 914 adjacent to the first surface 908a of the dielectric shield advantageously provides greater sensitivity to the object to be sensed. Sensing the object comprises determining a change in capacitance of a pixel 912, 912' (or pixels) in the pixel array 910.

The pixels 912, 912' can be arranged in a grid, for example a matrix, construction and are typically arranged linearly to simplify manufacturing. Linear arrangements in particular provide ease of manufacture when scaling up the array size, although the pixel array 910 is not limited to such a configuration.

Each pixel 912, 912' in the array 910 may also comprise a reference capacitor. The reference capacitor may be connected to the TFT 920 and the capacitive sensing electrode 914. One of the plates of the reference capacitor may be in line with and connected to the source-drain layer of the TFT 920, and the other may be in line with and connected to the source-drain layer of the TFT. The reference capacitor may help to reduce parasitic capacitance in the pixel array 910. A reference capacitor may also be stacked with the layers disposed on the dielectric shield 908. The reference capacitor enables touch capacitance measurement.

Figure 11:
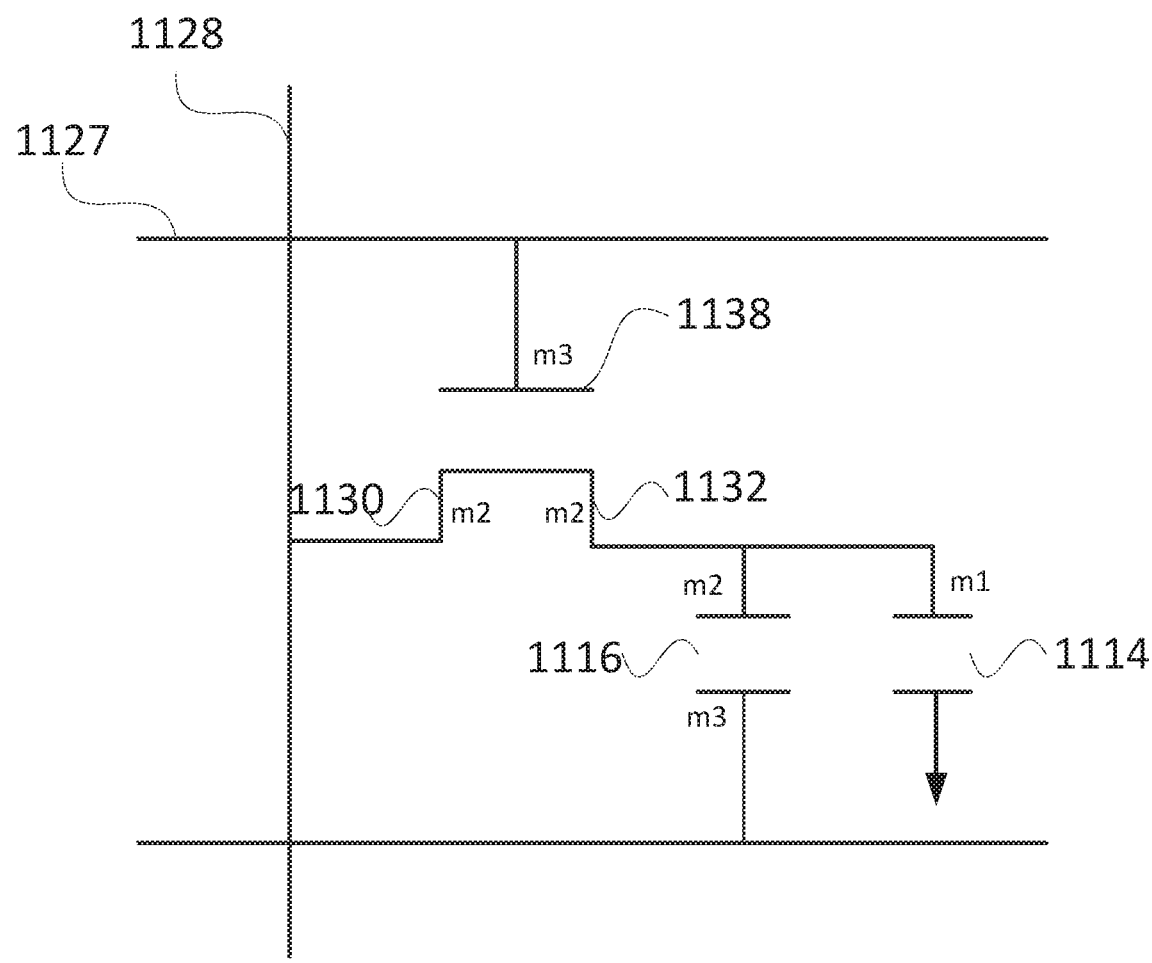
FIG. 11 is a schematic diagram of a pixel circuit diagram of a top gate structure of a pixel in a pixel array.

FIG. 11 illustrates a pixel circuit, which can be formed from the above described structure and deposition methods. The circuit comprises a TFT 1130, 1132, 1138, a reference capacitor 1116 and a capacitive sensing electrode 1114 and is addressed by a gate line 1127 and a source-data line 1128 and outputs to a common line, for example a Vcom connection. The TFT comprises a source region 1130, a drain region 1132 and a gate region 1138.

The pixel structure described above comprises three conductive layers which may be provided by metallisation layers, such as those deposited in the above method. The first metallisation layer, m1, for example the layer deposited on the carrier substrate (the dielectric shield), provides the capacitive sensing electrode 1114. A second metallisation layer, m2, in a top gate arrangement (see e.g. FIG. 9, Inset B), provides the source 1130 and drain 1132 region of the TFT 1120. One of the plates of the reference capacitor 1116 is also provided by the second metallisation layer and can further be connected to the drain region 1132, which may also be provided by that same metallisation layer. The third metallisation layer, m3, comprises the gate electrode 1138. A second plate of the reference capacitor 1116 may also be provided by the third metallisation layer, although it may be separated from the gate region 1138 as it is in FIG. 11, for example by patterning (for example by lithography or etching) during manufacture. In a bottom gate configuration (see FIG. 10, Inset C), the second and third metallisation layers are reversed. The conductive via provides an electrical connection between the capacitive sensing electrode 1114 and the drain region 1132 of the TFT 1120, as can be seen in FIG. 11.

As illustrated in FIG. 11, the deposited metal layers denoted as m1, m2 and m3 adjacent the features of the circuit in FIG. 11 can be connected to form the circuit. The illustrated circuit components if the circuit diagram in FIG. 11 depicts both top gate and bottom gate arrangements. A top gate configuration is illustrated in FIG. 11; it will be appreciated that m2 and m3 can be swapped in order to correspond to a bottom gate configuration.

It will be appreciated that the disclosure, as a whole, may be used to provide pixel circuits such as that described with reference to FIG. 11. It will however also be appreciated in the context of the present disclosure that other circuits may also be used, whereby the layers of the pixel are connected in a different manner such that a different circuit is made. The fundamental layers and the method of deposition methods would remain substantially consistent with the above disclosed embodiments. Advantages achieved by using the surface to be touched in a touch sensor also as the substrate for deposition of the pixel stack may of course be provided in other pixel circuits.

Figure 12:
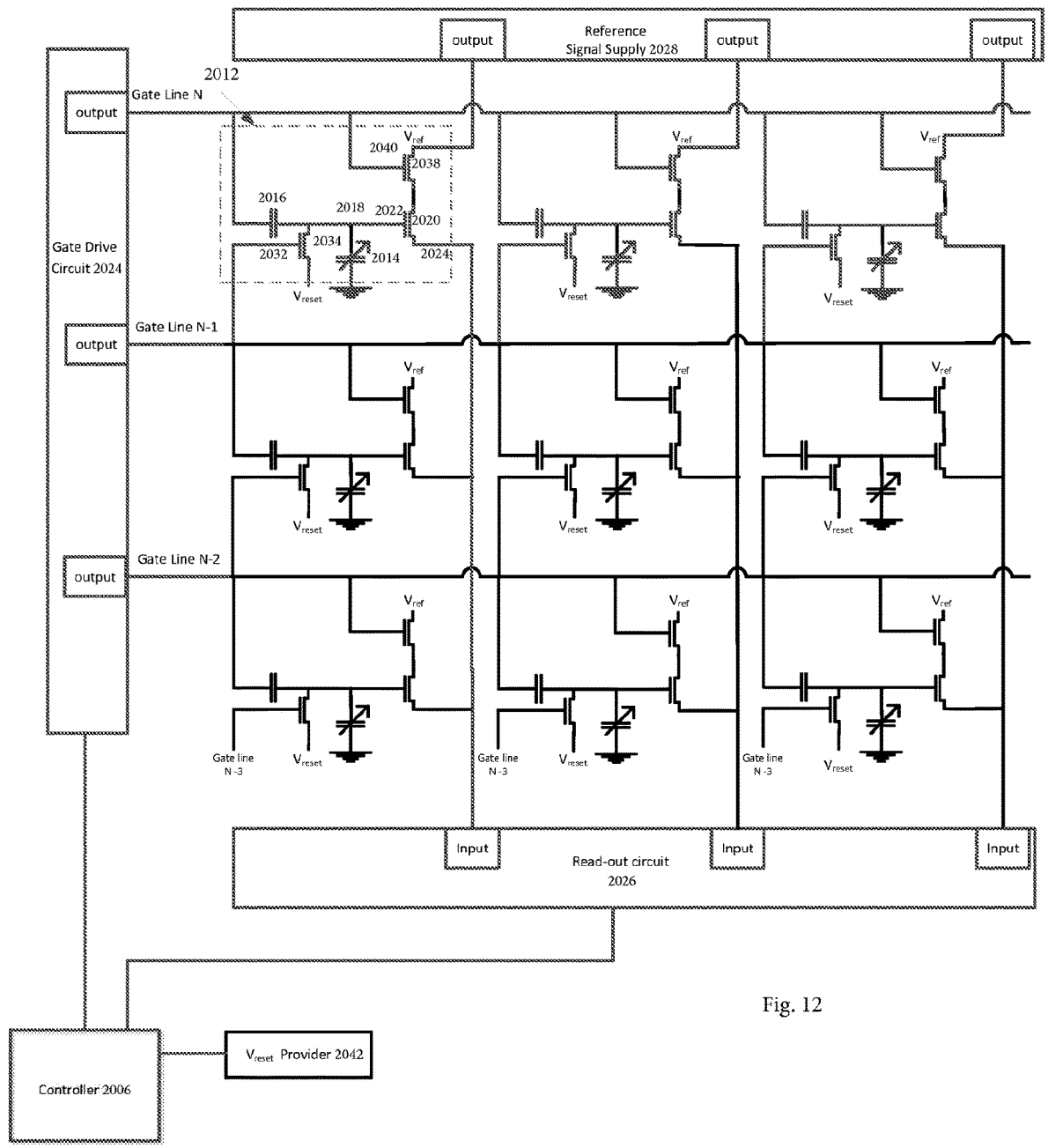
FIG. 12 shows a circuit diagram of another sensor array of the type shown in FIG. 7.

FIG. 12 illustrates another sensor array which may be used in the apparatus described herein, e.g. in the sensor array shown in FIG. 7.

FIG. 12 shows a sensor array 2010 comprising a plurality of pixels, and a reference signal supply 2028 for supplying a reference signal to the pixels. This can avoid the need for the gate drive power supply also to provide the current necessary for the read-out signal.

Also shown in FIG. 12 is the gate drive circuit 2024, the read-out circuit 2026, and the controller 2006.

The sensor array 2010 may also benefit from the inclusion of a reset circuit 2032, 2034 in each pixel. This may allow the control terminal 2022 of the pixel to be pre-charged to a selected reset voltage whilst the pixel is inactive (e.g. while another row of the array is being activated by the application of a gate pulse to another, different, row of the array).

In these embodiments the sensor may also comprise a reset voltage provider 2042 for providing a reset voltage to each of the pixels 2012 of the array as described below. The reset voltage provider 2042 may comprise voltage source circuitry, which may be configured to provide a controllable voltage, and may be connected to the controller 2006 to enable the controller 2006 to adjust and fix the reset voltage.

The reset voltage may be selected to tune the sensitivity of the pixel. In particular, the output current of the sense VCI 2020 typically has a characteristic dependence on the indicator voltage at the control terminal 2022 and its switch-on voltage. Thus the reset voltage may be chosen based on the switch-on voltage of the sense VCI 2020. The characteristic may also comprise a linear region in which it may be preferable to operate.

The pixels illustrated in FIG. 12 are similar to those illustrated in FIG. 7 and FIG. 8 in that each comprise a capacitive sensing electrode 2014, and a reference capacitor 2016 connected with a capacitive sensing electrode 2014. The connection between these two capacitances provides an indicator voltage, which can for example be connected to the control terminal 2022 of a sense VCI 2020. In addition, the pixels of the sensor array illustrated in FIG. 12 also comprise a further two VCIs 2034, 2038, and a connection to the reset voltage provider 2042, and a connection to the reference signal supply 2028.

As noted above, the sense VCI 2020 is arranged substantially as described above with reference to FIG. 7, in that its control terminal 2022 is connected to the connection between the reference capacitor 2016 and the capacitive sensing electrode 2014. However, the conduction path of the sense VCI 2020 is connected differently in FIG. 12 than in FIG. 7. In particular, the conduction channel of the select VCI 2038 connects the conduction channel of the sense VCI 2020 to the reference signal supply 2028 which provides a voltage $V_{ref}$. Thus, the conduction channel of the sense VCI 2020 is connected in series between the conduction channel of the select VCI 2038 and the input of the read-out circuit for the column. The select VCI 2038 therefore acts as a switch that, when open, connects the sense VCI 2020 between, $V_{ref}$, the reference signal supply 2028 and the input of the read-out circuit and, when closed, disconnects the sense VCI from the reference signal supply 2028. In the interests of clarity, the connection between the conduction channel of the select VCI and $V_{ref}$, the output of the reference signal supply 2028 is shown only in the top row of the array of pixels. The connection reference signal supply 2028 in the lower rows of the array is indicated in the drawing using the label $V_{ref}$.

The select VCI 2038 is therefore operable to inhibit the provision of signal from any inactive pixel to the input of the read-out circuit 2026. This can help to ensure that signal is only received from active pixels (e.g. those in the row to which the gate drive pulse is being applied).

In an embodiment each column of pixels is virtually connected to a ground or reference voltage. As such there may be no voltage differences on each of the columns thereby minimising parasitic capacitance. Furthermore, the reference signal supply may apply a current-drive rather than a voltage-drive which further reduces any effect parasitic capacitance could have on the signal applied by the active pixels on the inputs of the read-out circuit 2026.

The gate drive channel for the pixel row is connected to the first plate of the reference capacitor 2016, and to the control terminal of a select VCI 2038. As in the pixel illustrated in FIG. 7 and FIG. 8, the connection to the reference capacitor 2016 and capacitor sensing electrode 2014 means that the gate drive voltage is divided between the reference capacitor 2016 and the capacitive sensing electrode 2014 to provide the indicator voltage which controls the sense VCI 2020. The connection to the control terminal 2040 of the select VCI 2038 however means that, when the pixel is not active, the conduction path of the sense VCI 2020 is disconnected from the reference signal supply 2028.

A control terminal 2022 of the sense VCI 2020 is connected to the second plate of the reference capacitor 2016. The conduction path of the sense VCI 2020 connects the reference signal supply 2028 to the input of the read-out circuit 2026 for the pixel's column.

A conduction path of the reset VCI 2034 is connected between the second plate of the reference capacitor 2016 and a voltage output of the reset voltage provider, for receiving the reset voltage. The control terminal 2032 of the reset VCI 2034 is connected to a reset signal provider, such as the gate drive channel of another row of the sensor array. This can enable the reset VCI 2034 to discharge the reference capacitor 2016 during activation of another row of the array (e.g. a row of the array which is activated on the gate pulse prior to the pixel's row) or to pre-charge the control terminal 2022 of the sense VCI 2020 to the reset voltage.

Operation of the sensor array of FIG. 12 will now be described.

The gate drive circuit 2024 and the read-out circuit 2026 each receive a clock signal from the controller 2006. In response to this clock signal, the gate drive circuit 2024 activates a first gate drive channel of the gate drive circuit 2024 to provide a gate pulse to a row of the array 2010. A control voltage is thus applied to the control terminal of the select VCI 2038 of the pixels in the first row (the active row during this gate pulse).

The control voltage is also applied to the control terminal of the reset VCI 2034 of the pixels in a second row (inactive during this gate pulse).

In the first row (the active row), the conduction channel of the select VCI 2038 is switched into a conducting state by the control voltage (e.g. that which is provided by the gate pulse). The conduction channel of the select VCI 2038 thus connects the conduction channel of the sense VCI 2020 to the reference signal supply 2028.

The control voltage is also applied to the first plate of the reference capacitor 2016. The relative division of voltage between the sensing electrode 2014 and the reference capacitor 2016 provides an indicator voltage at the connection between the reference capacitor 2016 and the capacitive sensing electrode 2014 as described above with reference to FIG. 7 and FIG. 8. The indicator voltage is applied to the control terminal 2022 of the sense VCI 2020 to control the impedance of the conduction channel of the sense VCI 2020. Thus, the sense VCI 2020 connects the reference signal supply 2028 to the input channel of the read-out circuit 2026 for that column, and presents an impedance between the two which indicates the capacitance of the capacitive sensing electrode 2014. Please note, the reference signal supply may be provided by a constant voltage current supply.

A current is thus provided through the conduction path of the sense VCI 2020 from the reference signal supply 2028 to the input channel of the read-out circuit 2026 for the pixel's column. This current is determined by the voltage of the reference signal supply and by the impedance of the conduction channel of the sense VCI.

In response to the same clock signal from the controller 2006, the read-out circuit 2026 senses the pixel output signal at each input channel (e.g. by integrating the current provided to each input channel), and digitises this signal. The integration time of the read-out circuit 2026 may match the duration of the gate pulse.

Thus, in each clock cycle, the read-out 2026 circuit obtains a set of digital signals, each signal corresponding to the signals sensed from each column of the active row during the gate pulse. The output from each pixel 2012 in the row (each channel during that gate pulse) being indicative of the charge stored on the capacitive sensing electrode in that pixel.

In the second (inactive) row the control voltage is applied to the control terminal 2032 of the reset VCI 2034. This causes the reset VCI 2034 of the pixels in the inactive row to connect the second plate of their reference capacitors 2016 to a reset voltage provided by the reset voltage provider. This may discharge (e.g. at least partially remove) charge accumulated on the pixels of the inactive row, or it may charge them to the reset voltage, before they are next activated in a subsequent gate pulse. This reset voltage may be selected to tune the sensitivity of the pixels.

At the boundaries of the pixel array, where an N−1 gate line is not available, a dummy signal may be used to provide the control signal to the reset VCI. The gate drive circuit 2024 may provide the dummy signal. This may be provided by a gate drive channel which is only connected to the rest VCIs of a row at the boundary of the array, but not to any sense or select VCIs.

As illustrated in FIG. 12, the reset VCI 2034 of the pixels may be connected to the gate drive circuit so that each row is discharged in this way by the gate pulse which activates the immediately preceding row, which may be an adjacent row of the array.

Figure 13:
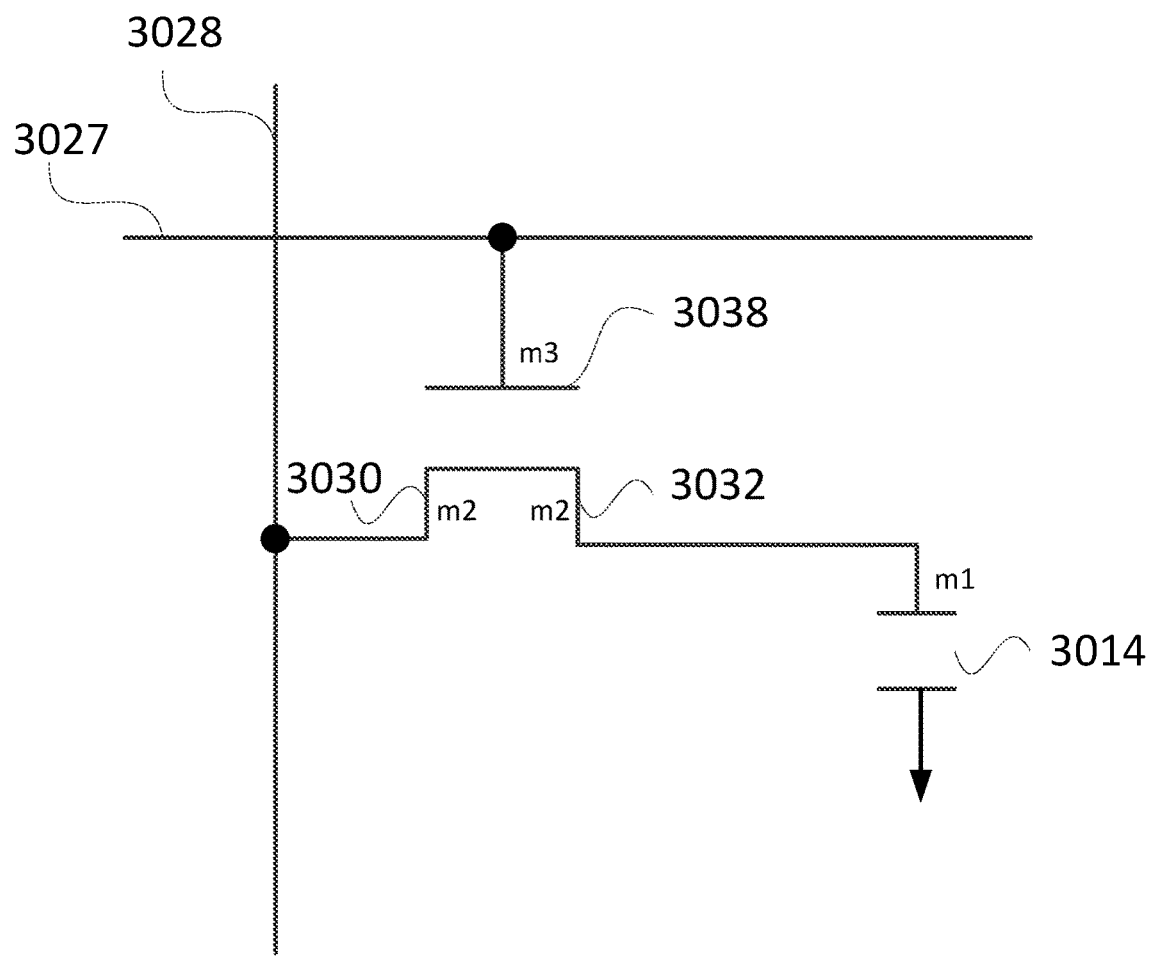
FIG. 13 is a schematic diagram of a pixel circuit diagram of a top gate structure of a pixel in a pixel array.

In other examples, a reference capacitor need not be provided. FIG. 13 illustrates one example pixel circuit in which a reference capacitor is not provided. This pixel circuit can be formed from the above described structure and deposition methods. The circuit comprises a TFT 3030, 3032, 3038, and a capacitive sensing electrode 3014. The pixel circuit may be addressed by a gate line 3027 and a source-data line 3028, and outputs to a common line, for example a Vcom connection. The TFT comprises a source region 3030, a drain region 3032 and a gate electrode 3038. The gate line 3027 is connected to the gate electrode 3038. The source region 3030 is connected to the source-data line 3028. The capacitive sensing electrode is connected to the drain region 3032, which is connected to the source region 3030, as shown in FIG. 13.

The example pixel circuit of FIG. 13 may be provided by a layered pixel structure. For example the layered pixel structure may comprise three conductive layers m1, m2, m3 are provided. These may be metallisation layers, such as those deposited in the above method. A first metallization layer m1 provides the capacitive sensing electrode 3014. The first metallization layer m1 may be deposited on a carrier substrate, such as a dielectric shield. A second metallisation layer, m2, provides the source 3030 and drain 3032 region of the TFT. The second layer m2 may be the type as would be provided in a top gate arrangement (see e.g. FIG. 9, Inset B). A third metallisation layer, m3, provides the gate electrode 3038. In a bottom gate configuration (see FIG. 10, Inset C), second and third metallisation layers are reversed. A conductive via may be provided to provide an electrical connection between the capacitive sensing electrode 3014 and the drain region 3032 of the TFT, as can be seen in FIG. 13.

As illustrated in FIG. 13, the deposited metal layers denoted as m1, m2 and m3 adjacent the features of the circuit in FIG. 13 can be connected to form the circuit. The illustrated circuit components of the circuit diagram in FIG. 13 may depict both top gate and bottom gate arrangements. A top gate configuration is illustrated in FIG. 13, but it will be appreciated that m2 and m3 can be swapped in order to correspond to a bottom gate configuration.

In some examples, a reference capacitor could be included in the pixel circuit of FIG. 13. The reference capacitor may be connected to the drain region 3032. For example, one of the plates of the reference capacitor may be provided by the second metallisation layer. A second plate of the reference capacitor may also be provided by the third metallisation layer. The second plate of the reference capacitor may be separated from the gate electrode 3038, for example by patterning (e.g. lithography or etching) during manufacture.

It will be appreciated that the disclosure, as a whole, may be used to provide pixel circuits such as that described with reference to FIG. 13. It will however also be appreciated in the context of the present disclosure that other circuits may also be used, whereby the layers of the pixel are connected in a different manner such that a different circuit is made. The fundamental layers and the method of deposition methods would remain substantially consistent with the above disclosed embodiments. Advantages achieved by using the surface to be touched in a touch sensor also as the substrate for deposition of the pixel stack may of course be provided in other pixel circuits.

A biometric skin-contact sensor of the type disclosed herein may be provided by the sensor apparatuses described above. Such a biometric skin-contact sensor may first be formed to provide a formable substrate (e.g. provided in isolation). This formable substrate may then be manipulated (e.g. bent) accordingly to conform to the shape of the pointing device 110. In the context of the present disclosure, it is to be appreciated that providing other components of the device (such as microswitch buttons or communication means for transmitting signals to the computer) would be within the remit of one of skill in the art. In examples, a substrate onto which the skin-contact sensor may be thinned down to a thickness at which it becomes conformable.

As set out above, pressure sensing may be used in combination with the biometric skin-contact sensing. Pressure sensors may be included to detect the pressure applied to the sensor. For example, a force-collector sensor may be used in which strain or deflection is measured in a component of the sensor, and the pressure is determined therefrom. Additionally and/or alternatively to the inclusion of a pressure sensor, pressure may be sensed based on the identified contact location and a surface area of this contact location. For example, an indication that the contact location has increased may indicate that the pressure being applied has increased. The pressure being applied may then be determined based on stored biometric identifier data for an operator (e.g. their normal fingertip area when resting on the sensor) and the current cross sectional area in contact with the sensor. This determination may be specific based on which region of their anatomy is in contact with the sensor. For example, the change in pressure may be determined based on both (i) the cross sectional area of the region in contact with the sensor and the normal cross-sectional area for such a region, and (ii) which region it is that is in contact within the sensor.

An amount of the increase in pressure may be determined based on an amount by which the contact area (the area of the operator's anatomy in contact with the device) has increased. Pressure sensing may be based on a ratio of a first contact area between the operator and the device and a second contact area between the operator and the device. Control of the pointer may be based on the determined pressure being applied. For example, an operator may move two fingers along the contact surface of the device to perform a scrolling function, and the speed with which scrolling occurs may be dependent on the amount of pressure they are applying to the device. Pressure may be determined based on which part of the operator's anatomy is in contact with the device. For example, for a given region of an operator's anatomy there may be localised variations in which specific region is in contact with the device. For example, an operator may press lightly with the tip of a finger, but may press more firmly using the underside of the top portion of their finger, as opposed to the tip of the finger.

Examples of the present disclosure have described stored biometric identifier data. It is to be appreciated in the context of this disclosure that such stored data may be obtained using the biometric skin-contact sensor. Additionally and/or alternatively, such stored data may be obtained from a separate resource, such as another computer which has previously obtained biometric identifier data associated with that operator which has since been stored. The stored data may correspond to the type of data (e.g. format and content) which is to be obtained using the biometric skin-contact sensor.

Skin contour data for an operator's left and right hands may differ. By obtaining biometric identifier data for regions of an operator's hand in contact with the device, it is possible to determine which hand is in contact with the device based on the obtained biometric identifier data. This may be determined by the device itself (e.g. in the controller) or it may be determined by the computer after the device has output a signal to the computer indicating the biometric identifier data. Control of the pointer in the GUI and control of the computer itself may be based on which hand is determined to be operating the device. For example, a left-handed operator may be identified, and the operation of the device controlled based on the operator being left-handed. That is, pressing with a left index finger may provide conventional 'left button' functionality despite actually being on the right-hand side of the device.

A controller (e.g. of the pointing device) may be configured to obtain biometric identity and to determine therefrom if the operator is using their right hand or their left hand. The controller may switch mode depending on this determination. For example, in the event that it is determined that the operator is using their left-hand, the device may be switched into a left-hand' mode. In the left-hand mode, the functionality of the device may be changed to accommodate for the use of a left hand. This may include changing the actions associated with selected interactions with the device so that the output (e.g. the controlling of the GUI/computer) is dependent on which operator's hand is engaged with the device. This may occur without the need to manually change the settings for the device on the computer. A pair of pointing devices may be provided, one for each of an operator's hands. This may find application for e.g. gaming, where the pair of pointing devices improves ergonomics for interaction with a computer.

It is to be appreciated in the context of the present disclosure that whilst reference has been made to a pointing device for controlling the operation of a graphical user interface, the pointing device may also be suitable for providing control with any sort of a user interface (UI). Devices of the present disclosure have been described as having an operation interface for sensing operation by an operator of the device for controlling the pointer in the GUI. In some examples, the operation interface may be a manipulation interface, wherein the biometric skin-contact sensor is a contact surface of the manipulation interface configured to obtain the biometric identifier data during the manipulation to control the pointer.

It is to be appreciated in the context of the present disclosure that whilst examples have related to control of a pointer in a GUI, embodiments of the present disclosure may find wider application. For example, authorisation of the operator based on the obtained biometric identifier data may enable the pointing device to control access to a selected cloud computer, e.g. selected based on their biometric identifier data. For example, the pointing device may provide the authorisation for the operator to access the relevant computing resource using their interaction with the device.

It is to be appreciated in the context of the present disclosure that while description has been made to a few specific examples of a conformal biometric skin-contact sensor, these examples may not be considered limiting. For example, other examples of suitable sensors may include use of at least one of: (i) thermal detection e.g. with low temperature polycrystalline silicon, (ii) infrared sensing, (iii) ultrasound sensing.

It will be appreciated from the discussion above that the embodiments shown in the figures are merely exemplary, and include features which may be generalised, removed or replaced as described herein and as set out in the claims. Wth reference to the drawings in general, it will be appreciated that schematic functional block diagrams are used to indicate functionality of systems and apparatus described herein. In addition the processing functionality may also be provided by devices which are supported by an electronic device. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

As will be appreciated by the skilled reader in the context of the present disclosure, each of the examples described herein may be implemented in a variety of different ways. Any feature of any aspects of the disclosure may be combined with any of the other aspects of the disclosure. For example method aspects may be combined with apparatus aspects, and features described with reference to the operation of particular elements of apparatus may be provided in methods which do not use those particular types of apparatus. In addition, each of the features of each of the embodiments is intended to be separable from the features which it is described in combination with, unless it is expressly stated that some other feature is essential to its operation. Each of these separable features may of course be combined with any of the other features of the embodiment in which it is described, or with any of the other features or combination of features of any of the other embodiments described herein. Furthermore, equivalents and modifications not described above may also be employed without departing from the invention.

Certain features of the methods described herein may be implemented in hardware, and one or more functions of the apparatus may be implemented in method steps. It will also be appreciated in the context of the present disclosure that the methods described herein need not be performed in the order in which they are described, nor necessarily in the order in which they are depicted in the drawings. Accordingly, aspects of the disclosure which are described with reference to products or apparatus are also intended to be implemented as methods and vice versa. The methods described herein may be implemented in computer programs, or in hardware or in any combination thereof. Computer programs include software, middleware, firmware, and any combination thereof. Such programs may be provided as signals or network messages and may be recorded on computer readable media such as tangible computer readable media which may store the computer programs in non-transitory form. Hardware includes computers, handheld devices, programmable processors, general purpose processors, application specific integrated circuits (ASICs), field programmable gate arrays (FPGAs), and arrays of logic gates.

Any processors used in the computer system (and any of the activities and apparatus outlined herein) may be implemented with fixed logic such as assemblies of logic gates or programmable logic such as software and/or computer program instructions executed by a processor. The computer system may comprise a central processing unit (CPU) and associated memory, connected to a graphics processing unit (GPU) and its associated memory. Other kinds of programmable logic include programmable processors, programmable digital logic (e.g., a field programmable gate array (FPGA), a tensor processing unit (TPU), an erasable programmable read only memory (EPROM), an electrically erasable programmable read only memory (EEPROM), an application specific integrated circuit (ASIC), or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof. Such data storage media may also provide the data store of the computer system (and any of the apparatus outlined herein).

Other examples and variations of the disclosure will be apparent to the skilled addressee in the context of the present disclosure.

The invention claimed is:

1. A pointing device for controlling the position of a pointer in a graphical user interface, GUI, of a computer, the device comprising:
   an operation interface for sensing operation by an operator of the device for controlling the pointer in the GUI, wherein operation of the GUI and/or the pointer in the GUI is controlled based on the obtained biometric identifier data for said operator;
   a biometric skin-contact sensor configured to obtain biometric identifier data, for identifying the operator, by sensing contact of surface contours of the operator's skin;
   wherein the biometric skin-contact sensor is a contact surface of the operation interface configured to obtain the biometric identifier data during the operation to control the pointer; and
   wherein the biometric skin-contact sensor comprises an array of sensor pixels, each sensor pixel comprising a voltage-controlled impedance, VCI, and a capacitive sensing electrode, wherein the capacitive sensing electrode is coupled to the control terminal of the VCI and a conductive channel of the VCI is connected between a reference signal supply and an input to a read-out circuit.

2. The apparatus of claim 1, wherein the operation interface is provided by a touch sensitive surface, and the apparatus comprises a controller configured to:

identify a contact location of the operator's skin on the touch sensitive surface, and control both (a) the biometric skin-contact sensor and (b) the pointer, based on (c) the contact location.

3. The apparatus of claim 2, wherein the controller is configured to identify the contact location by operating the touch sensitive surface at a first resolution thereby to control the pointer, and to obtain the biometric identifier data by operating the touch sensitive surface at a second resolution, higher than the first resolution.

4. The apparatus of claim 3, wherein the controller is configured to select a region of the touch sensitive surface to be operated at the second resolution based on the contact location.

5. A pointing device for controlling the position of a pointer in a graphical user interface, GUI, of a computer, the device comprising:

an operation interface for sensing operation by an operator of the device for controlling the pointer in the GUI; and a biometric skin-contact sensor configured to obtain biometric identifier data, for identifying the operator, by sensing contact of surface contours of the operator's skin;

wherein the biometric skin-contact sensor is a contact surface of the operation interface configured to obtain the biometric identifier data during the operation to control the pointer; and wherein the operation interface comprises:

a movement sensor for sensing movement of the device for controlling the position of the pointer based on movement of the device; and a scroll sensor for causing scrolling in the GUI, wherein the scrolling is controlled based on obtained biometric identifier data;

wherein the biometric skin-contact sensor comprises an array of sensor pixels, each sensor pixel comprising a voltage-controlled impedance, VCI, and a capacitive sensing electrode, wherein the capacitive sensing electrode is coupled to the control terminal of the VCI and a conductive channel of the VCI is connected between a reference signal supply and an input to a read-out circuit.

6. The apparatus of claim 5 wherein the scroll sensor comprises the biometric skin-contact sensor.

7. The apparatus of claim 1 comprising a controller configured to identify, based on the biometric identifier data, a predefined anatomical location on the operator's skin and to control the GUI based on the predefined anatomical location.

8. The apparatus of claim 7, wherein the controller is operable to differentiate between at least two of said predefined locations on the operator's skin, and to select between corresponding control actions based on the predefined location identified by the biometric identifier data.

9. A system comprising:

the pointing device of claim 1; and a computer;

wherein the pointing device is coupled to the computer to control operation thereof;

wherein the system is configured to determine whether obtained biometric identifier data for the operator of the pointing device corresponds to stored biometric identity data associated with an authorised user of the computer.

10. The system of claim 9, wherein the system is configured to permit the operator of the pointing device to access secure files on the computer in the event that the obtained biometric identifier data for the operator corresponds to stored biometric identity data associated with an authorised user of the computer.

11. The system of claim 9, wherein the system is configured to only permit the operator of the pointing device to access and/or view secure files on the computer in response to confirming that the operator of the pointing device is an authorised used of the computer based on the obtained biometric identifier data for said operator.

12. The system of claim 9, wherein the system is configured to determine whether or not to unlock one or more particular functionalities of the computer for the operator of the pointing device based on the obtained biometric identifier data for said operator.

13. A method of controlling a graphical user interface, GUI, of a computer, the method comprising:

sensing operation by an operator of an operation interface of a pointing device for controlling a pointer in the GUI wherein the pointing device comprises a contact surface comprising a biometric skin-contact sensor;

in response to said sensing, operating the biometric skin-contact sensor to obtain biometric identifier data, suitable for identifying the operator, by sensing contact of surface contours of the operator's skin with the contact surface, wherein operation of the GUI and/or the pointer in the GUI is controlled based on the obtained biometric identifier data;

wherein the biometric skin-contact sensor comprises an array of sensor pixels each sensor pixel comprising a voltage-controlled impedance, VCI, and a capacitive sensing electrode, wherein the capacitive sensing electrode is coupled to the control terminal of the VCI and a conductive channel of the VCI is connected between a reference signal supply and an input to a read-out circuit.

14. The method of claim 13, wherein the biometric identifier data is obtained from the contact surface during the operation to control the pointer.

15. The method of claim 13 wherein the operation interface comprises a touch sensitive surface for controlling the pointer, the method comprising identifying a contact location of the operator's skin on the surface, controlling the pointer based on the contact location; and activating a region of the touch sensitive surface to provide the biometric skin-contact sensor, wherein the region is selected based on the contact location.

16. The method of claim 15 comprising:

identifying the contact location to control the pointer by operating the touch sensitive surface at a first resolution, and obtaining the biometric identifier data by operating the touch sensitive surface in the activated region at a second resolution, higher than the first resolution.

17. The method of claim 15 comprising identifying an anatomical location of the operator's skin based on the biometric identifier data.

18. The method of claim 17 wherein identifying an anatomical location comprises differentiating between fingers of the operator's hands.

19. The method of claim 17 comprising determining a surface area of the operator's skin in contact with the biometric skin-contact sensor, and controlling the GUI based on the surface area and the anatomical location.

20. A non-transitory computer program product configured to program a computer system to perform the method of claim 13.

\* \* \* \* \*